US008793389B2

(12) United States Patent
Lindner et al.

(10) Patent No.: US 8,793,389 B2
(45) Date of Patent: Jul. 29, 2014

(54) EXCHANGING A COMPRESSED VERSION OF PREVIOUSLY COMMUNICATED SESSION INFORMATION IN A COMMUNICATIONS SYSTEM

(75) Inventors: Mark A. Lindner, San Diego, CA (US); Shane R. Dewing, San Diego, CA (US); Devang N. Bhatt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 13/331,033

(22) Filed: Dec. 20, 2011

(65) Prior Publication Data

US 2013/0159539 A1     Jun. 20, 2013

(51) Int. Cl.
*G06F 15/16* (2006.01)

(52) U.S. Cl.
USPC ........... 709/228; 709/226; 709/227; 715/753; 379/202.01

(58) Field of Classification Search
USPC .......................... 709/228, 226, 227; 715/753; 379/202.01
See application file for complete search history.

(56) References Cited

U.S. PATENT DOCUMENTS 5,764,915 A *   6/1998   Heimsoth et al. ............. 709/227
7,984,157 B2 *  7/2011   Panasyuk et al. ............. 709/227
2004/0081292 A1  4/2004   Brown et al.
2007/0021131 A1  1/2007   Laumen et al.
2007/0263626 A1  11/2007  Warden
2009/0125589 A1  5/2009   Anand et al.
2010/0241749 A1 *  9/2010  Rasmussen et al. .......... 709/226
2010/0306674 A1 * 12/2010  Salesky et al. ................ 715/753
2010/0316207 A1 * 12/2010  Brunson ................. 379/202.01
2013/0250803 A1  9/2013   ABRAHAM et al.

OTHER PUBLICATIONS

International Search Report and Written Opinion—PCT/US2012/070330—ISA/EPO—Apr. 3, 2013.

* cited by examiner

*Primary Examiner* — Tammy Nguyen
(74) *Attorney, Agent, or Firm* — Raphael Freiwirth

(57) ABSTRACT

In an embodiment, a server exchanges session data between a group of session participants during a communication session, the exchanged session data including session media and/or session signaling information. The server stores at least a subset of the exchanged session data. Later, the server establishes a connection to a given user equipment (UE) (e.g., either after or during the communication session). The server determines a UE-defined context that is indicative of a manner by which missed session data from the communication session is to be compressed for delivery to the given UE. The server selectively compresses at least a portion of the stored subset of the exchanged session data that was missed by the given UE based on the UE-defined context, and transmits the selectively compressed portion of the stored subset of the exchanged session data to the given UE.

25 Claims, 16 Drawing Sheets

*STORE-N-FWD SHOWING FORWARDING*
*OF ALL MISSED DATA (NO SELECTIVITY)*

UE DROPS OUT OF SESSION, REJOINS
AND IS SENT COMPRESSED MEDIA

UE DROPS OUT OF SESSION, REJOINS AFTER SESSION
TERMINATION AND IS SENT COMPRESSED MEDIA

UE JOINS SESSION LATE, RECEIVES COMPRESSED MEDIA
THAT WAS MISSED AND BEGINS SESSION PARTICIPATION

AFTER SESSION TERMINATION, UE THAT WAS
NOT AN ORIGINAL PARTICIPANT IN SESSION
RECEIVES COMPRESSED MEDIA FROM SESSION

AFTER SESSION TERMINATION, UE THAT WAS
AN ORIGINAL PARTICIPANT IN SESSION
RECEIVES COMPRESSED MEDIA FROM SESSION

SELECTIVE COMPRESSION BASED ON
PRE-CONFIGURED UE-SPECIFIC CONTEXT

SELECTIVE COMPRESSION BASED ON UE-SPECIFIED
CONTEXT AT TIME OF REQUEST FOR MISSED DATA

MEDIA REDUCTION EXAMPLE

MEDIA REDUCTION EXAMPLE

EXCHANGING A COMPRESSED VERSION OF PREVIOUSLY COMMUNICATED SESSION INFORMATION IN A COMMUNICATIONS SYSTEM

BACKGROUND OF THE INVENTION

1. Field of the Invention

Embodiments of the invention relate to exchanging a compressed version of previously communicated session information in a communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

In W-CDMA wireless communication systems, user equipments (UEs) receive signals from fixed position Node Bs (also referred to as cell sites or cells) that support communication links or service within particular geographic regions adjacent to or surrounding the base stations. Node Bs provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the Node Bs generally interact with UEs through an over the air interface and with the RAN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as W-CDMA, CDMA, FDMA, TDMA, GSM, etc. In a dispatch model, communication between endpoints (e.g., UEs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Communications between mobile users are often subject to connection failures between devices as one or more devices are not reachable due to fades or other offline reasons. Users must either reattempt the communication, or a use a store-and-forward system will capture the content for retrieval.

Therefore an efficient retrieval of missed messages in a mobile guaranteed delivery system, with a method for efficiently apprising and aligning newcomers to a group communication of current and past activity is needed.

SUMMARY

In an embodiment, a server exchanges session data between a group of session participants during a communication session, the exchanged session data including session media and/or session signaling information. The server stores at least a subset of the exchanged session data. Later, the server establishes a connection to a given user equipment (UE) (e.g., either after or during the communication session). The server determines a UE-defined context that is indicative of a manner by which missed session data from the communication session is to be compressed for delivery to the given UE. The server selectively compresses at least a portion of the stored subset of the exchanged session data that was missed by the given UE based on the UE-defined context, and transmits the selectively compressed portion of the stored subset of the exchanged session data to the given UE.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
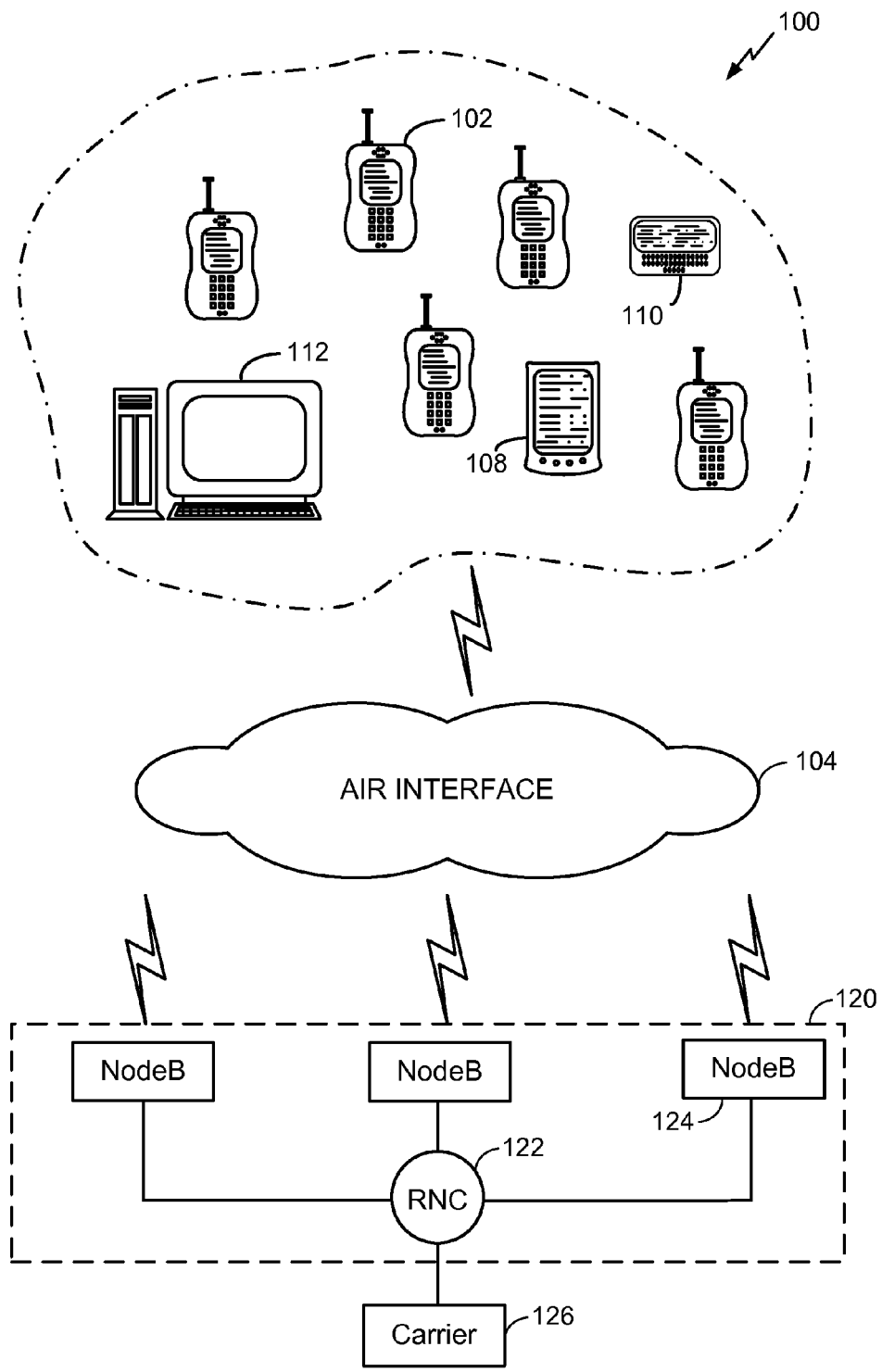
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple access terminals.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the UE 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of UE including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal", "AT", "wireless device", "client device", "mobile terminal", "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2A:
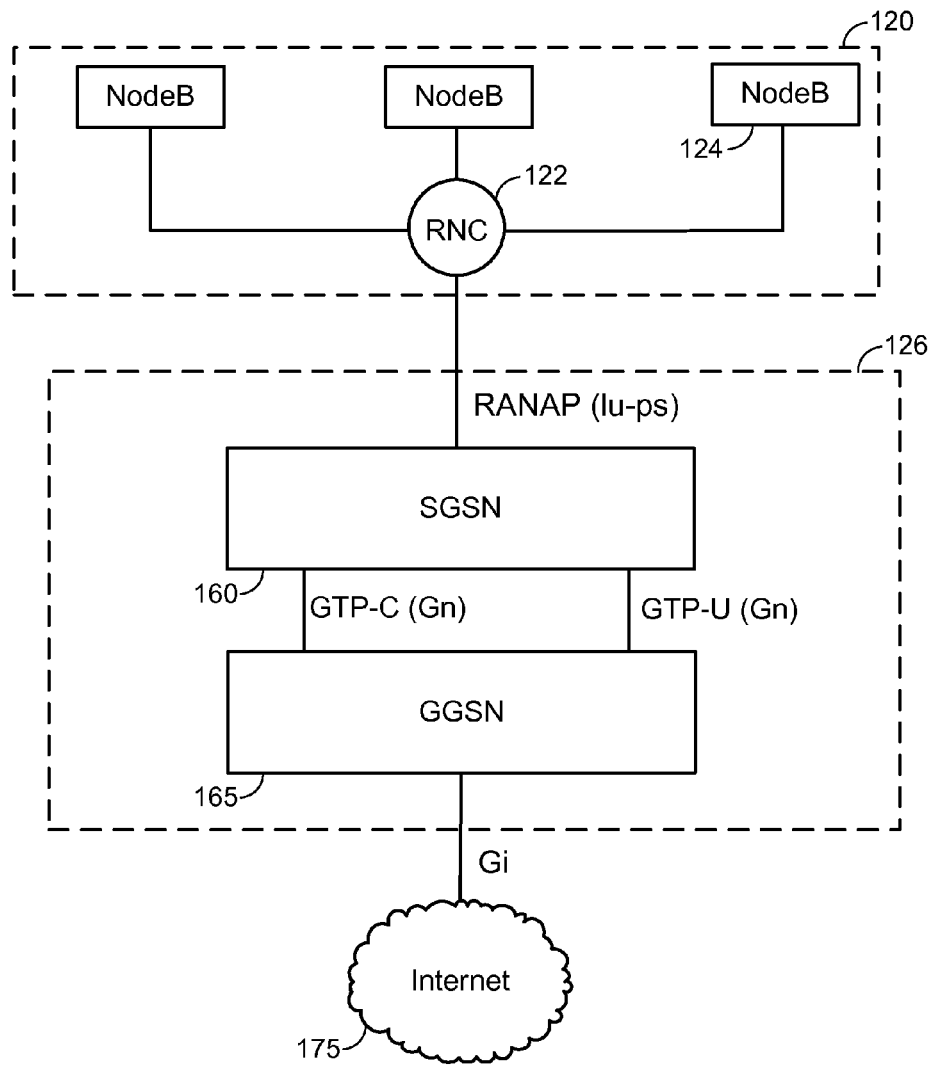
FIG. 2A illustrates the core network of FIG. 1 according to an embodiment of the present invention.

FIG. 2A illustrates the core network 126 according to an embodiment of the present invention. In particular, FIG. 2A illustrates components of a General Packet Radio Services (GPRS) core network implemented within a W-CDMA system. In the embodiment of FIG. 2A, the core network 126 includes a Serving GPRS Support Node (SGSN) 160, a Gateway GPRS Support Node (GGSN) 165 and an Internet 175. However, it is appreciated that portions of the Internet 175 and/or other components may be located outside the core network in alternative embodiments.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the internet as if from one location at the GGSN 165. This is achieved transferring the subscriber's data from the subscriber's current SGSN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the external packet data network 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination UE served by the RAN 120. Thereby, the GGSN 165 stores the current SGSN address of the target UE and his/her profile in its location register (e.g., within a PDP context). The GGSN is responsible for IP address assignment and is the default router for the connected UE. The GGSN also performs authentication and charging functions.

The SGSN 160 is representative of one of many SGSNs within the core network 126, in an example. Each SGSN is responsible for the delivery of data packets from and to the UEs within an associated geographical service area. The tasks of the SGSN 160 includes packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or UE. Thus, SGSNs are responsible for (i) de-tunneling downlink GTP packets from the GGSN 165, (ii) uplink tunnel IP packets toward the GGSN 165, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in Universal Mobile Telecommunications System (UMTS) system architecture) communicates with the SGSN 160 via a Radio Access Network Application Part (RANAP) protocol. RANAP operates over a Iu interface (Iu-ps), with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.). In the embodiment of FIG. 2A, the Gn between the SGSN 160 and the GGSN 165 carries both the GTP-C and the GTP-U. While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

Figure 2B:
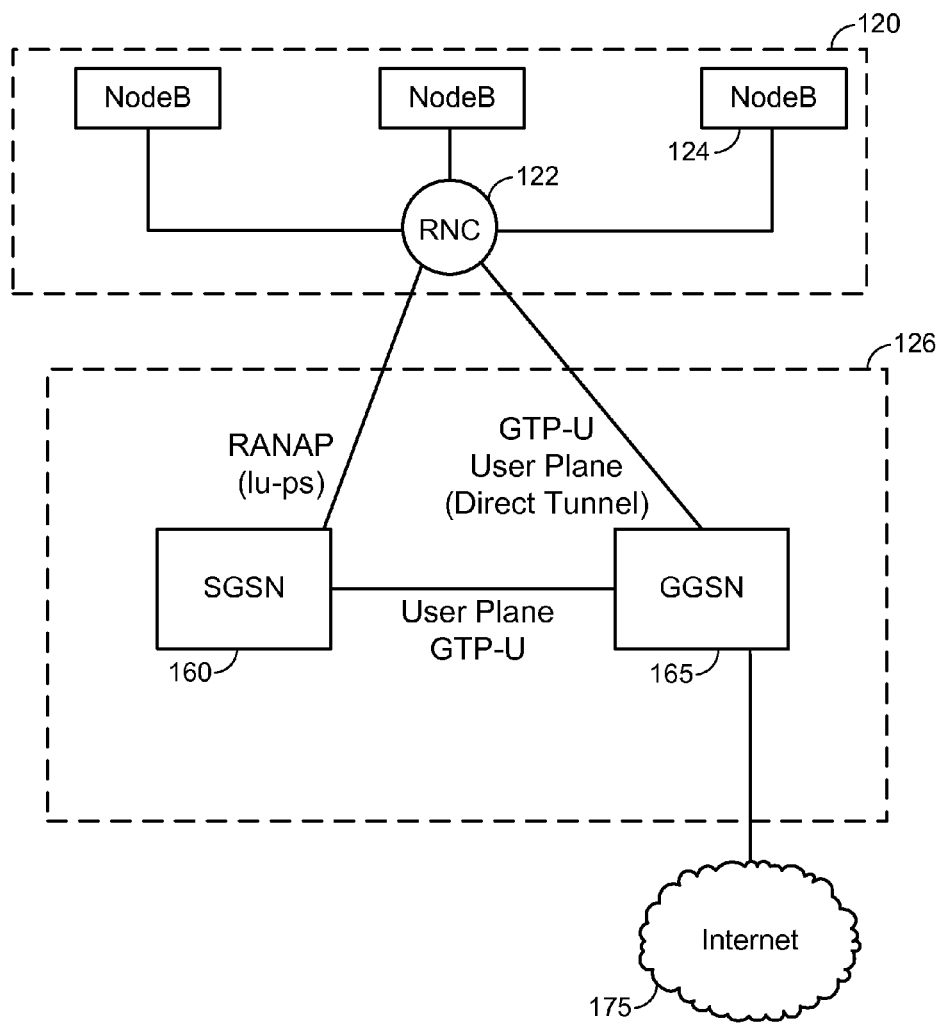
FIG. 2B illustrates the core network of FIG. 1 according to another embodiment of the present invention.

FIG. 2B illustrates the core network 126 according to another embodiment of the present invention. FIG. 2B is similar to FIG. 2A except that FIG. 2B illustrates an implementation of direct tunnel functionality.

Direct Tunnel is an optional function in Iu mode that allows the SGSN 160 to establish a direct user plane tunnel, GTP-U, between RAN and GGSN within the Packet Switched (PS) domain. A direct tunnel capable SGSN, such as SGSN 160 in FIG. 2B, can be configured on a per GGSN and per RNC basis whether or not the SGSN can use a direct user plane connection. The SGSN 160 in FIG. 2B handles the control plane signaling and makes the decision of when to establish Direct Tunnel. When the Radio Bearer (RAB) assigned for a PDP context is released (i.e. the PDP context is preserved) the GTP-U tunnel is established between the GGSN 165 and SGSN 160 in order to be able to handle the downlink packets.

The optional Direct Tunnel between the SGSN 160 and GGSN 165 is not typically allowed (i) in the roaming case (e.g., because the SGSN needs to know whether the GGSN is in the same or different PLMN), (ii) where the SGSN has received Customized Applications for Mobile Enhanced Logic (CAMEL) Subscription Information in the subscriber profile from a Home Location Register (HLR) and/or (iii) where the GGSN 165 does not support GTP protocol version 1. With respect to the CAMEL restriction, if Direct Tunnel is established then volume reporting from SGSN 160 is not possible as the SGSN 160 no longer has visibility of the User Plane. Thus, since a CAMEL server can invoke volume reporting at anytime during the life time of a PDP Context, the use of Direct Tunnel is prohibited for a subscriber whose profile contains CAMEL Subscription Information.

The SGSN 160 can be operating in a Packet Mobility Management (PMM)-detached state, a PMM-idle state or a PMM-connected state. In an example, the GTP-connections shown in FIG. 2B for Direct Tunnel function can be established whereby the SGSN 160 is in the PMM-connected state and receives an Iu connection establishment request from the UE. The SGSN 160 ensures that the new Iu connection and the existing Iu connection are for the same UE, and if so, the SGSN 160 processes the new request and releases the existing Iu connection and all RABs associated with it. To ensure that the new Iu connection and the existing one are for the same UE, the SGSN 160 may perform security functions. If Direct Tunnel was established for the UE, the SGSN 160 sends an Update PDP Context Request(s) to the associated GGSN(s) 165 to establish the GTP tunnels between the SGSN 160 and GGSN(s) 165 in case the Iu connection establishment request is for signaling only. The SGSN 160 may immediately establish a new direct tunnel and send Update PDP Context Request(s) to the associated GGSN(s) 165 and include the RNC's Address for User Plane, a downlink Tunnel Endpoint Identifier (TEID) for data in case the Iu connection establishment request is for data transfer.

The UE also performs a Routing Area Update (RAU) procedure immediately upon entering PMM-IDLE state when the UE has received a RRC Connection Release message with cause "Directed Signaling connection re-establishment" even if the Routing Area has not changed since the last update. In an example, the RNC will send the RRC Connection Release message with cause "Directed Signaling Connection re-establishment" when it the RNC is unable to contact the Serving RNC to validate the UE due to lack of Iur connection (e.g., see TS 25.331[52]). The UE performs a subsequent service request procedure after successful completion of the RAU procedure to re-establish the radio access bearer when the UE has pending user data to send.

The PDP context is a data structure present on both the SGSN 160 and the GGSN 165 which contains a particular UE's communication session information when the UE has an active GPRS session. When a UE wishes to initiate a GPRS communication session, the UE must first attach to the SGSN 160 and then activate a PDP context with the GGSN 165. This allocates a PDP context data structure in the SGSN 160 that the subscriber is currently visiting and the GGSN 165 serving the UE's access point.

Figure 2C:
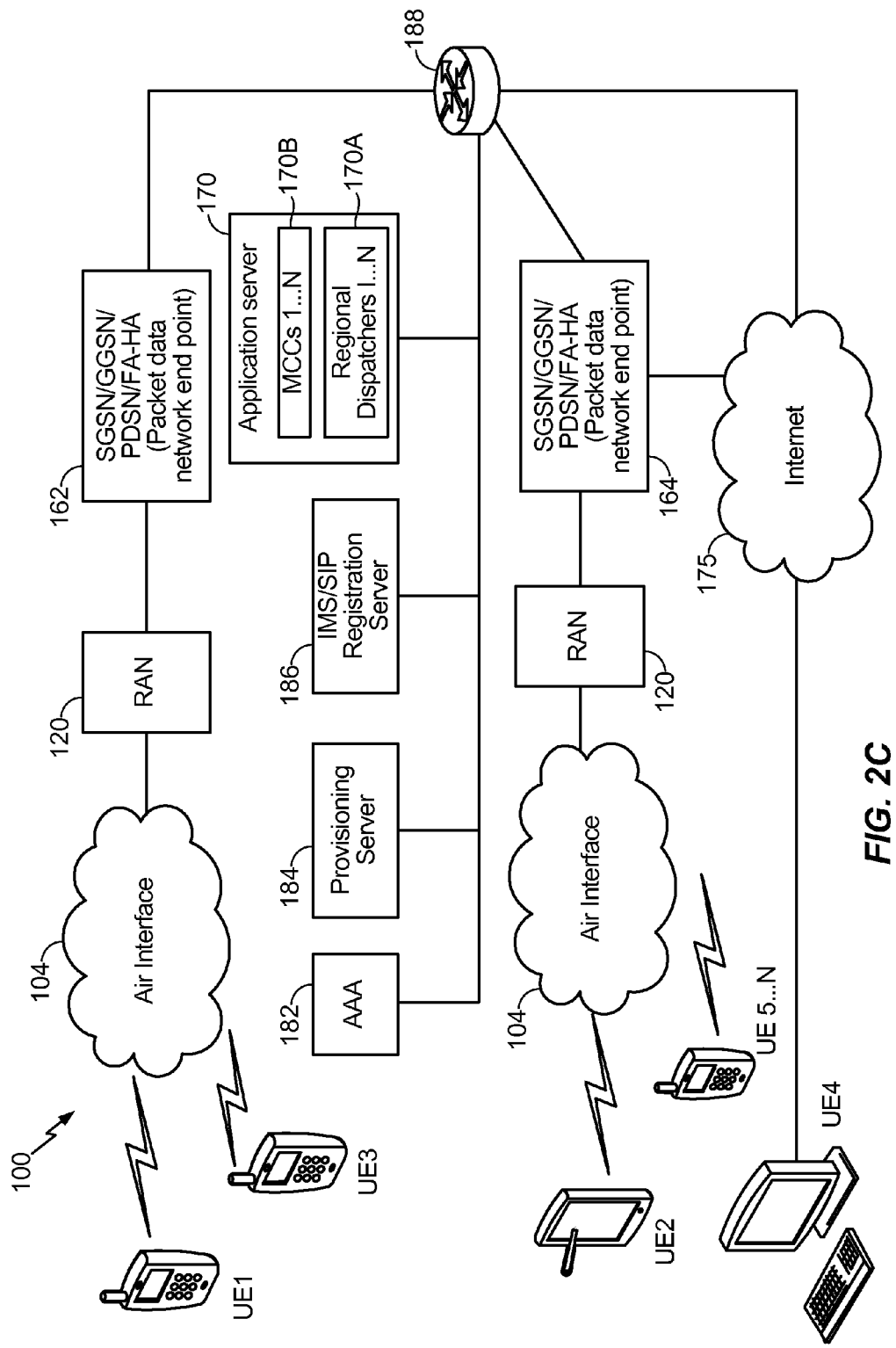
FIG. 2C illustrates an example of the wireless communications system of FIG. 1 in more detail.

FIG. 2C illustrates an example of the wireless communications system 100 of FIG. 1 in more detail. In particular, referring to FIG. 2C, UEs 1 . . . N are shown as connecting to the RAN 120 at locations serviced by different packet data network end-points. The illustration of FIG. 2C is specific to W-CDMA systems and terminology, although it will be appreciated how FIG. 2C could be modified to confirm with a 1x EV-DO system. Accordingly, UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 . . . N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2C, UEs 1, 3 and 5 . . . N are illustrated as wireless cell-phones, UE 2 is illustrated as a wireless tablet-PC and UE 4 is illustrated as a wired desktop station. However, in other embodiments, it will be appreciated that the wireless communication system 100 can connect to any type of UE, and the examples illustrated in FIG. 2C are not intended to limit the types of UEs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2C, the application server 170 is illustrated as including a plurality of media control complexes (MCCs) 1 . . . N 170B, and a plurality of regional dispatchers 1 . . . N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between UEs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the UEs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
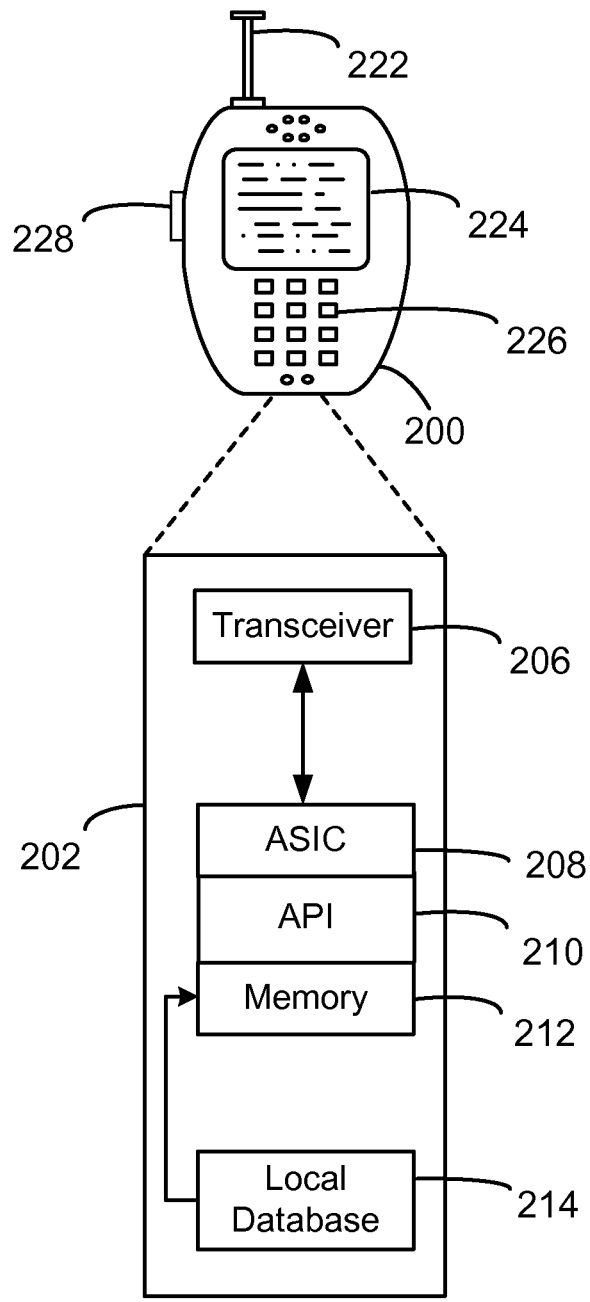
FIG. 3 is an illustration of a user equipment (UE) in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between the client device 102, Node B(s) 124, and the RNC 122. The RNC 122 can be connected to multiple data networks such as the core network 126, PSTN, the Internet, a virtual private network, a SGSN, a GGSN and the like, thus allowing the UE 102 or 200 access to a broader communication network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Store-and-forward is a communications protocol in which data exchanged between session participants during a communication session is monitored and stored by a server, such as the application server 170. The server may mediate the exchange of the session data for the communication session, in one embodiment. In another embodiment, the server may not be directly associated with mediation and/or arbitration functions of the communication session, and may simply be forwarded the session data to the UE.

In another embodiment, the server can retrieve, at some later time, the stored session data for delivery to a requested UE for the UE that dropped out of the communication session and thereby missed receipt of at least a portion of the session data. For example, the session participant may have dropped out of the communication session for any number of reasons, including restrictions of wireless radio range (e.g., the session participants drives into a tunnel, etc.), noise, signal fading conditions, etc.

An example of a conventional store-and-forward implementation can be direct towards an E-mail delivery procedure whereby a target of a given E-mail is not available to receive the given E-mail. In this case, an E-mail server stores the given E-mail for later delivery, which can occur via one or more periodic attempts to re-transmit the given E-mail to the target or upon request from the target (e.g., the target logs onto the E-mail server to check for any missed E-mails, etc.). Thus, at a high level, store-and-forward protocols generally store media at a network entity for subsequent delivery to a target device when the media is not capable of being delivered in real-time.

Figure 4:
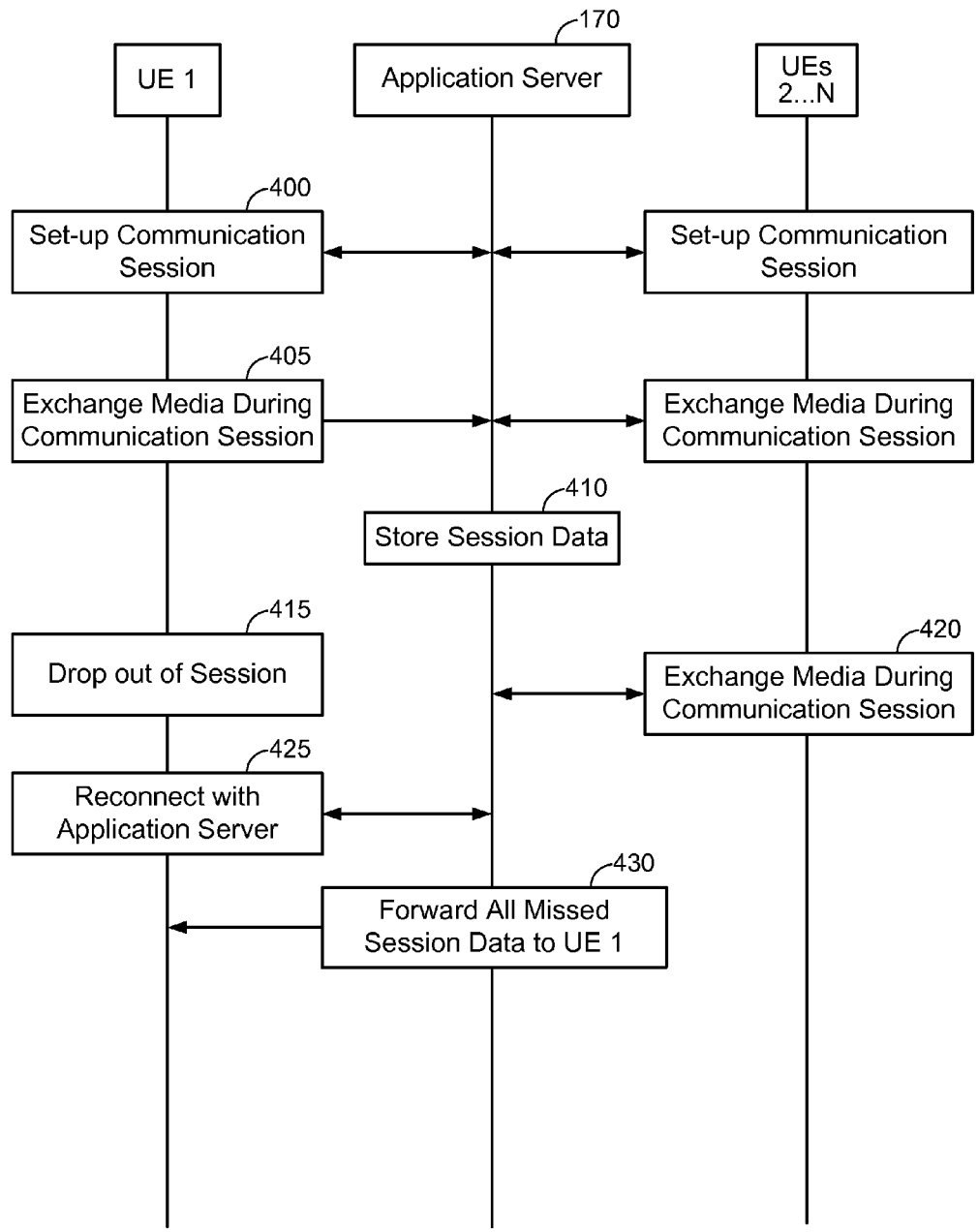
FIG. 4 illustrates an example of a conventional store-and-forward process.

FIG. 4 illustrates an example of a conventional store-and-forward process. Referring to FIG. 4, the application server 170 sets-up a communication session (e.g., a half-duplex communication session such as PTT, a full-duplex communication session such as VoIP, etc.) between UEs 1 . . . N, 400 (e.g., where N=2 for a direct or one-to-one communication session and N>2 for a group communication session). Accordingly, the application server 170 begins arbitrating the communication session between UEs 1 . . . N by exchanging media during communication session, 405. During the communication session that is arbitrated by the application server 170, the application server 170 stores session data, such as session media (e.g., audio, video, text, etc.) and/or signaling information, 410 (e.g., indications of which UEs are floor-holders at different times, information regarding which UEs are participating in the communication session at different times, etc.).

Referring to FIG. 4, at some point during the communication session, assume that UE 1 drops out of the communication session, 415. For example, in 415, the user of UE 1 may have determined to end his/her participation in the communication session, UE 1 may have lost connectivity to the RAN 120, etc. However, even though UE 1 drops out of the communication session in 415, UEs 2 . . . N continue to exchange media during the communication session, 420. Accordingly, it will be appreciated that UE 1 misses media that is exchanged between UEs 2 . . . N after UE 1 has dropped out off, and is no longer participating in the communication session.

At some later point in time (e.g., while the communication session is on-going or after the communication session is terminated altogether), UE 1 re-establishes its connection to the application server 170, 425. In response to the re-connection of 425, the application server 170 retrieves the session data stored at 410 and forwards all of the session data that was missed by UE 1 following the drop-out of 415 to UE 1, 430.

As will be appreciated by one of ordinary skill in the art, a server that is executing a conventional store-and-forward protocol generally forwards all session data that is missed by a particular UE for a communication session. However, a user of the particular UE may only be interested in a portion of the missed session data (e.g., audio but not video, session data from a subset of the UEs participating in the session and not other UE(s), etc.). While conventional store-and-forward protocols can automatically discard or overwrite certain data (e.g., location requests, presence information, etc.) when the data becomes irrelevant (e.g., due to age, or due the data no longer being accurate), conventional store-and-forward protocols do not compress the stored session data which is missed by a given UE based on UE-defined or UE-specific criteria. Accordingly, embodiments of the invention are directed to selectively compressing session data that was missed by a given UE in accordance with a context that is specific to and/or defined by the given UE.

Figure 5A:
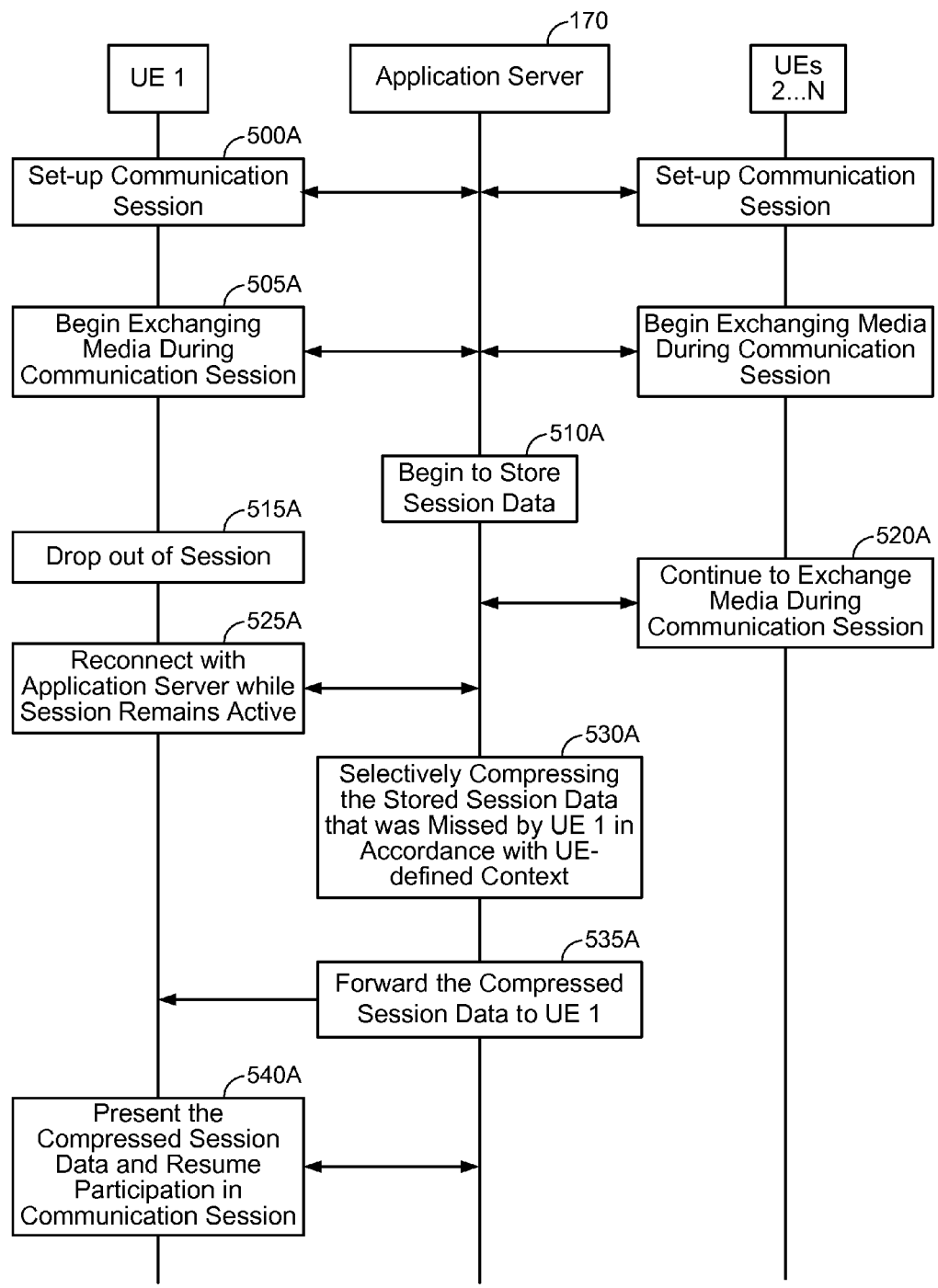
FIG. 5A illustrates a process of selectively compressing session data that is missed by a given UE after the given UE drops out of a communication session and the communication session is still active in accordance with an embodiment of the invention.

FIG. 5A illustrates a process of selectively compressing session data that is missed by a given UE ("UE 1") after the given UE drops out of a communication session in accordance with an embodiment of the invention. In particular, FIG. 5A illustrates an example whereby the given UE re-joins the communication session after the drop-out while the communication session is still on-going, and is sent the selectively compressed missed session data in conjunction with resumption of the given UE's participation in the communication session.

Referring to FIG. 5A, the application server 170 sets-up a communication session between UEs 1 . . . N, 500A (e.g., where N=2 for a direct or one-to-one communication session and N>2 for a group communication session). Accordingly, the application server 170 begins arbitrating a communication session between UE 1 . . . N by exchanging session data during the communication session, 505A. During the communication session that is arbitrated by the application server 170, the application server 170 stores session data, such as the exchanged session media (e.g., audio, video, text, etc.) and/or signaling information, 510A (e.g., indications of which UEs are floor-holders at different times, information regarding which UEs are participating in the communication session at different times, etc.). At some point during the communication session, assume that UE 1 drops out of the communication session, 515A (e.g., UE 1 may have lost connectivity to RAN 120, etc.). However, even though UE 1 drops out of the communication session in 515A, UEs 2 . . . N continue to exchange session data during the communication session, 520A. Accordingly it will be appreciated that UE 1 misses session data that is exchanged between UE 2 . . . N after UE 1 has dropped off and is no longer participating in the communication session. At some later point in time, but while the communication session is on-going, UE 1 re-establishes its connection to the application server 170, 525A. In response to the re-connection of 525A, the application server 170 retrieves the session data stored at 510A and determines how much of the session data was missed by UE 1 following the drop-out of 515A. Unlike FIG. 4 whereby the application server 170 simply forwards all of the missed session data to UE 1, the application server 170 then selectively compresses the stored session data that was missed by UE 1 in accordance with a UE-defined context for UE 1, 530A. Examples of the UE-defined context as well as different ways the stored session data can be compressed will be described in greater detail below. Generally, the UE-defined context can correspond to a context (e.g., a set of preferences, an operational state, a location, etc.) of UE 1 or a user of UE 1. For example, a determination of which applications are executing on UE 1 can contribute to the UE-defined context for UE 1. Alternatively, the user can indicate that he/she is uninterested in video content or content from certain UEs, which can form part of the UE-defined context for UE 1. After the selective session data compression of 530A, the application server 170 forwards the compressed session data to UE 1, 535A. After receiving the forwarded data of 535A, UE 1 presents the compressed session data and resumes its participation in the active communication session with the UEs 2 . . . N, 540A. For example, the compressed session data can be presented as a text-translation of audio exchanged between UEs 2 . . . N while UE 1 was absent from the communication session, such that UE 1 can resume the communication session in conjunction with permitting its user to "catch up" with the other session participants by reviewing the text-translation. Other examples of session data compression will be described in more detail below.

Figure 5B:
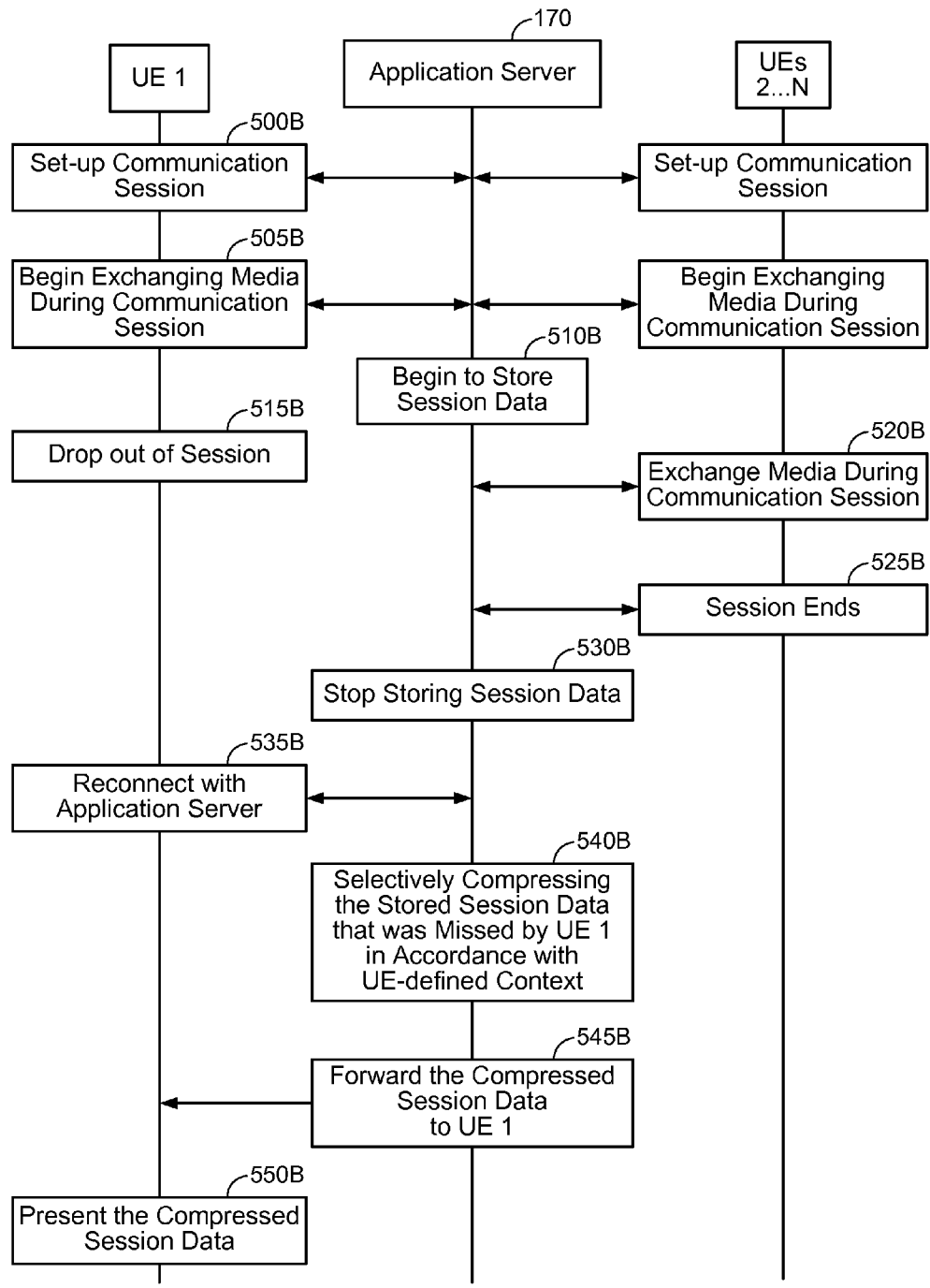
FIG. 5B illustrates a process of selectively compressing session data that is missed by a given UE after the given UE drops out of a communication session and the communication session is terminated in accordance with an embodiment of the invention.

While FIG. 5A is related to the application server 170 provisioning UE 1 with a selectively compressed version of missed session data in conjunction with resuming its participation in a still-active communication session, FIG. 5B is directed towards the application server 170 provisioning UE 1 with a selectively compressed version of missed session data after communication session has been terminated.

FIG. 5B illustrates a process of selectively compressing session data that is missed by a given UE ("UE 1") after the given UE drops out of a communication session in accordance with an embodiment of the invention. In particular, FIG. 5B illustrates an example whereby the given UE re-joins the communication session after the communication session is terminated, and is sent the selectively compressed missed session data.

Referring to FIG. 5B, the application server 170 sets-up a communication session between UEs 1 . . . N, 500B. Accordingly, the application server 170 begins arbitrating a communication session between UE 1 . . . N by exchanging session data during communication session, 505B. During the communication session that is arbitrated by the application server 170, the application server 170 stores session data, such as session media (e.g., audio, video, text, etc.) and/or signaling information, 510B (e.g., indications of which UEs are floor-holders at different times, information regarding which UEs are participating in the communication session at different times, etc.). At some point during the communication session, assume that UE 1 drops out of the communication session, 515B (e.g., UE 1 may have lost connectivity to RAN 120, etc.). However, even though UE 1 drops out of the communication session in 515B, UEs 2 . . . N continue to exchange session data during the communication session, 520B. Accordingly it will be appreciated that UE 1 misses session data that is exchanged between UE 2 . . . N after UE 1 has dropped off, and is no longer participating in the communication session. At some later point in time, and after the session ends, 525B, the application server 170 stops storing session data, 530B. After the session has ended, 525B, UE 1 re-establishes its connection to the application server 170, 535B. In response to the re-connection of 535B, the application server 170 retrieves the session data stored at 510B and determines how much of the session data was missed by UE 1 following the drop-out of 515B. The application server 170 then selectively compresses the stored session data that was missed by UE 1 in accordance with a UE-defined context for UE 1, 540B. As noted above with respect to 530A of FIG. 5A, examples related to the UE-defined context and manners in which the session data can be selectively compressed will be described in more detail below. After the session data compression of 540B, the application server 170 forwards the compressed session data to UE 1, 545B. Other examples of session data compression will be described in more detail below. After receiving the forwarded data of 545B, UE 1 presents the compressed session data to catch-up on the material from the communication session that was missed due to UE 1 dropping out, 550B. As noted above with respect to 540A of FIG. 5A, other examples of session data compression will be described in more detail below.

Figure 6A:
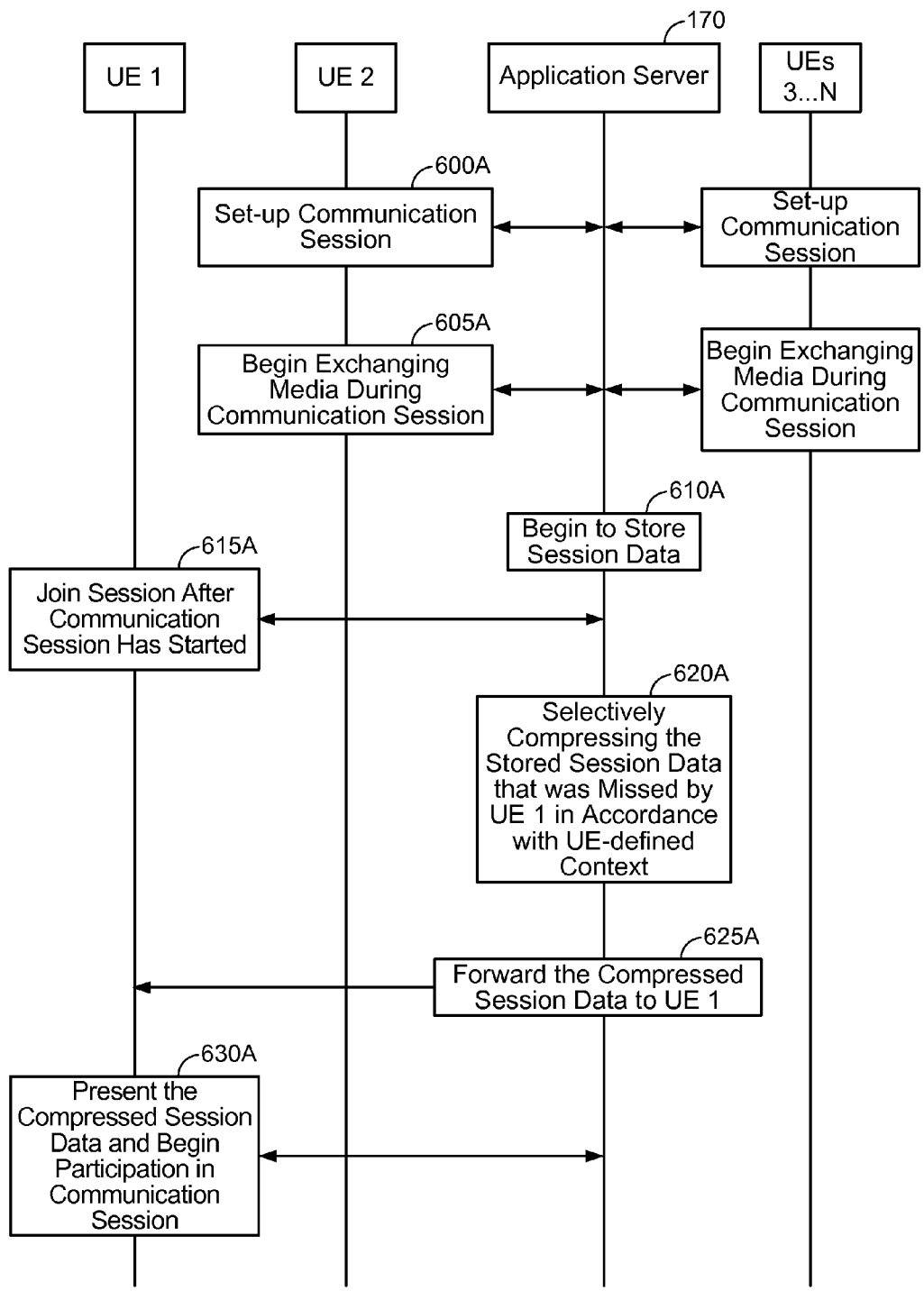
FIG. 6A illustrates a process of selectively compressing session data that is missed by a given UE after the given UE joins the communication session late in accordance with an embodiment of the invention.
Figure 6B:
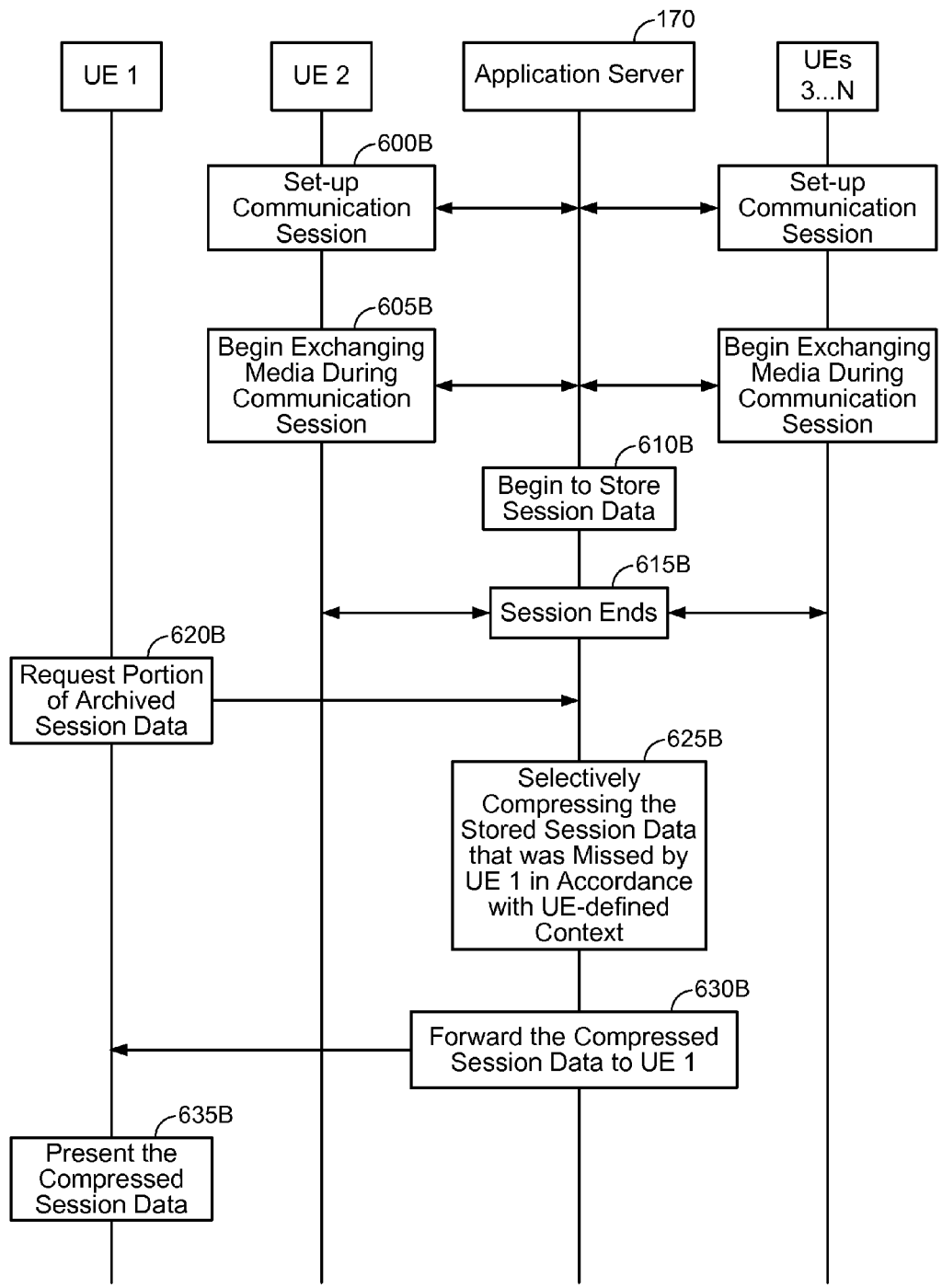
FIG. 6B illustrates a process of selectively compressing session data that is missed by a given UE that was never actually a participant in the communication session in accordance with an embodiment of the invention.

While FIG. 5A and FIG. 5B are related to UE 1 being one of the original participants starting the session, FIGS. 6A and 6B are directed towards UE 1 joining the communication session late and not being an original participant in the session.

FIG. 6A illustrates a process of selectively compressing session data that is missed by a given UE ("UE 1") after the given UE joins the communication session late in accordance with an embodiment of the invention. In particular, FIG. 6A illustrates an example whereby the given UE, which is not an original participant, joins the communication session after the communication session is started, and is sent the selectively compressed missed session data to "catch-up" with the existing communication session. In this embodiment, UE1 can either catch-up before participating in the communication session or concurrently participates while doing the catch-up (e.g. live audio for the communication session and text transcript of selectively compressed missed session data).

Referring to FIG. 6A, the application server 170 sets-up a communication session between UEs 2 . . . N, 600A. Accordingly, the application server 170 begins arbitrating a communication session between UE 2 . . . N by exchanging session data during communication session, 605A. During the communication session that is arbitrated by the application server 170, the application server 170 stores session data, such as session media and/or signaling information, 610A. At some point during the communication session, assume that UE 1, which was not an original participant, joins the communication session, 615A. Accordingly it will be appreciated that UE 1 misses session data that is exchanged between UE 2 . . . N before UE 1 has joined. In response to UE 1 joining the communication session, the application server 170 retrieves the session data stored at 610A and determines how much of the session data was missed by UE 1 before the joining of 615A. The application server 170 then selectively compresses the stored session data that was missed by UE 1 in accordance with a UE-defined context for UE 1, 620A. As noted above with respect to 530A of FIG. 5A, examples related to the UE-defined context and manners in which the session data can be selectively compressed will be described in more detail below. After the selective session data compression of 620A, the application server 170 forwards the selectively compressed session data to UE 1, 625A. After receiving the forwarded data of 625A, UE 1 presents the compressed session data to a user to permit the user to catch-up on the material from the communication session, 630A. As noted above with respect to 540A of FIG. 5A, other examples of session data compression will be described in more detail below. In a further example, the presentation of 630A can occur prior to UE 1 beginning active participation in the communication session in real-time with UEs 2 . . . N (e.g., UE 1 can play the missed session data in fast-forward or high-speed mode until real-time is reached, after which UE 1 is permitted to actively engage in the real-time communication session). In an alternative example, the presentation of 630A can occur contemporaneously or concurrently with UE 1 beginning active participation in the communication session (e.g., UE 1 can present a text transcript of the missed session data while also playing out live media, such as audio or video media, for the communication session in real-time).

While FIG. 6A is related to a late joining UE to a still-active active communication obtaining missed session data from earlier in the communication session, FIG. 6B is directed towards a UE obtaining missed or archived session data associated with a terminated communication session, whereby the UE was not ever actually a participant in the terminated communication session.

Referring to FIG. 6B, 600B through 610B correspond to 600A through 610A of FIG. 6A, and as such will not be described further for the sake of brevity. At some point after the communication session ends, 615B, assume that UE 1, which was not a participant in the communication session, requests a portion of the archived session data, 620B. The request of 620B by UE 1 can be active (e.g., UE 1 transmits a request for the portion of the archived session data to the application server 170) or implicit (e.g., UE 1 may be some type of administrator with a preference setting to receive certain portions of communication sessions involving one or more of UEs 2 . . . N, such as where UE 1 is controlled by a manager and UEs 2 . . . N are controlled by employees of the manager). In response to UE 1's request of the archived session data, the application server 170 retrieves the session data stored at 610B. The application server 170 then selectively compresses the stored session data that was missed by UE 1 in accordance with a UE-defined context for UE 1, 625B. As noted above with respect to 530A of FIG. 5A, examples related to the UE-defined context and manners in which the session data can be selectively compressed will be described in more detail below. After the session data compression of 625B, the application server 170 forwards the compressed session data to UE 1, 630B. After receiving the forwarded data of 630B, UE 1 presents the compressed session data from the communication session that UE 1 requested, 635B.

In a further example for FIG. 6B, UE 1 is invited to a review a previous communication session after the communication session has ended. In this case, instead of simply playing the whole missed communication session to UE 1, one or more of the UEs that actually participated in the old communication session can specify one or more "catch-up points" within the communication session, prompting the application server 170 to compress the session data for the communication session (in 625B) in accordance with the one or more catch-up points. For example, the catch-up points can be used by the UEs that participated in the communication to point out or high-light the most relevant parts of the communication session (e.g., in a general manner or parts of the communication session deemed especially relative for UE 1 specifically). The application server 170 can then forward the selectively compressed session data that focuses on the above-noted catch-up point(s) to UE 1 in 630B.

In another example for FIG. 6B, UEs 1 . . . N may be part of the same communication group, but UE 1 was "offline" during the communication session for the group as shown in FIG. 6B between UEs 2 . . . N. As discussed above, one or more of the online UEs (i.e., UEs 2 . . . N) can mark relevant positions (e.g., a "read from here" points or catch-up points) within the communication session, prompting the application server 170 to selectively compress (or sync) a subset of the missed session data based on the marked position(s).

Figure 6C:
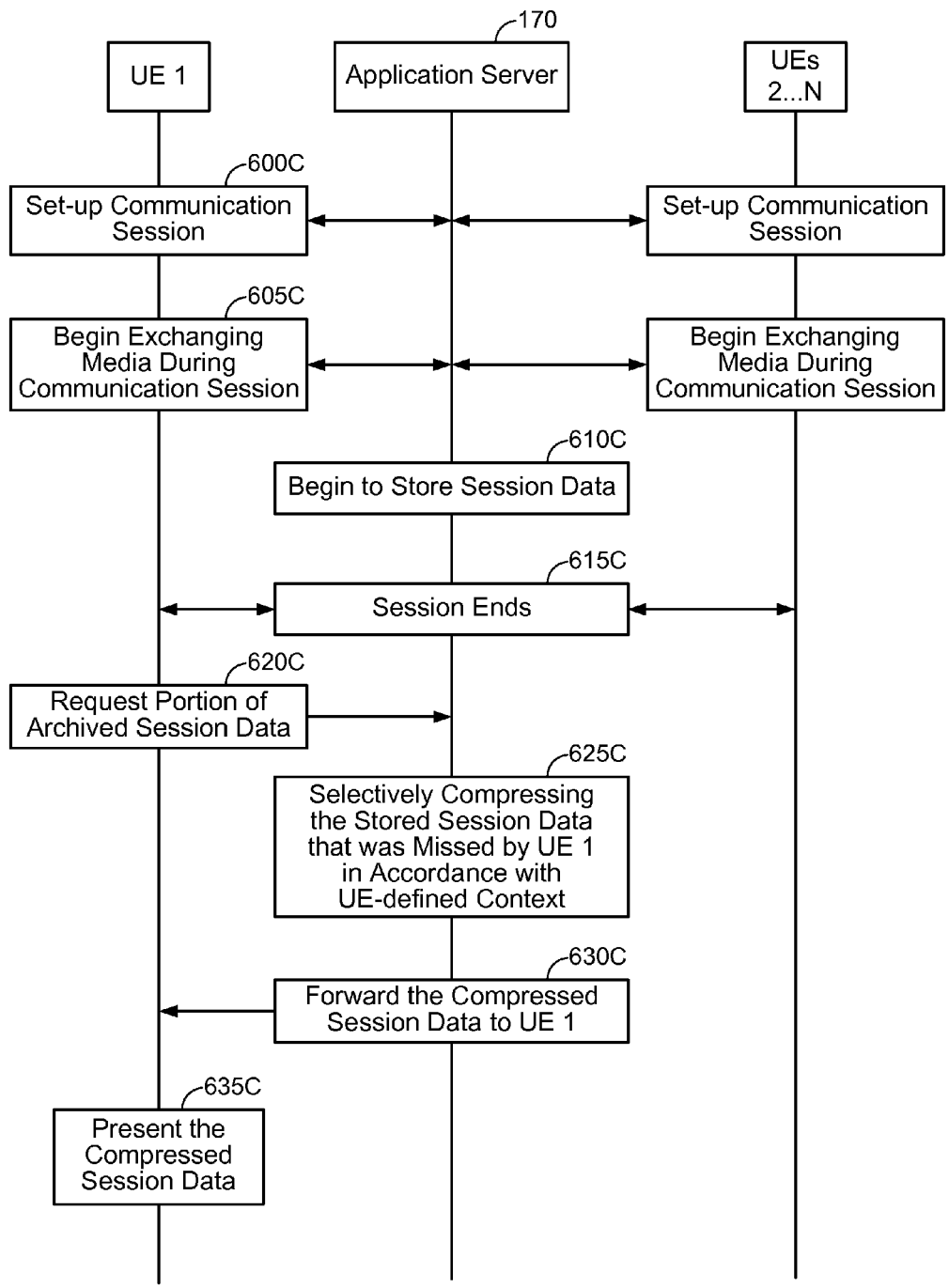
FIG. 6C illustrates a process of selectively compressing session data for a given UE that earlier participated in the communication session in accordance with an embodiment of the invention.

FIG. 6C is similar to FIG. 6B except that FIG. 6B illustrates an example whereby UE 1 did not participate in a terminated communication session for which UE 1 subsequently requests archived session data, and FIG. 6C illustrates an example whereby UE participates in a communication session and later requests archived session data for the same communication session. Thus, 600C and 605C are similar to 600B and 605B of FIG. 6B, respectively, except that UE 1 is also a session participant in 600C and 605C. After 605C, 610C through 635C of FIG. 6C are similar to 610B through 635B of FIG. 6B and as such will not be described further for the sake of brevity.

Figure 7A:
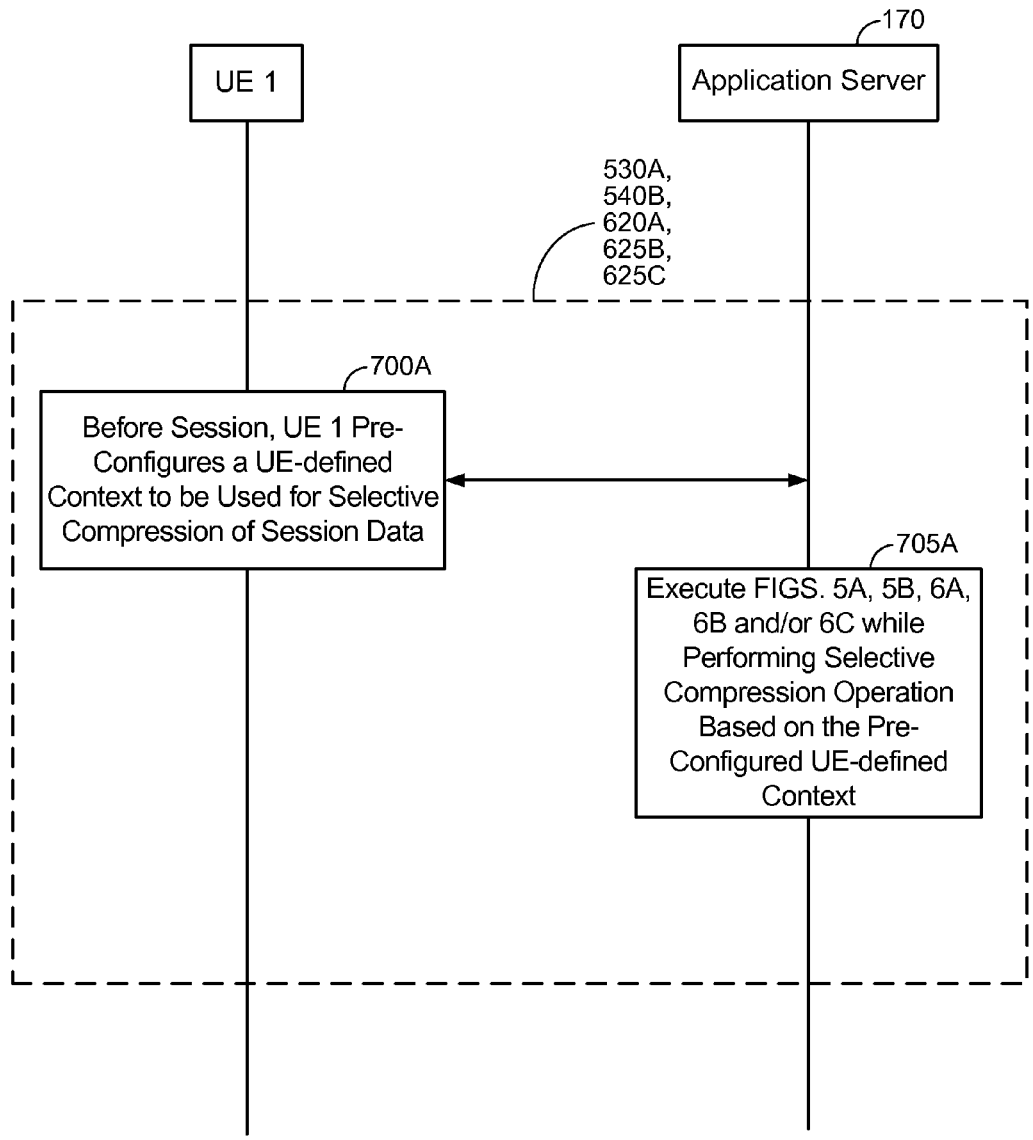
FIG. 7A illustrates an example of providing an application server with a UE-defined context used to selectively compress session data in accordance with an embodiment of the invention.
Figure 7B:
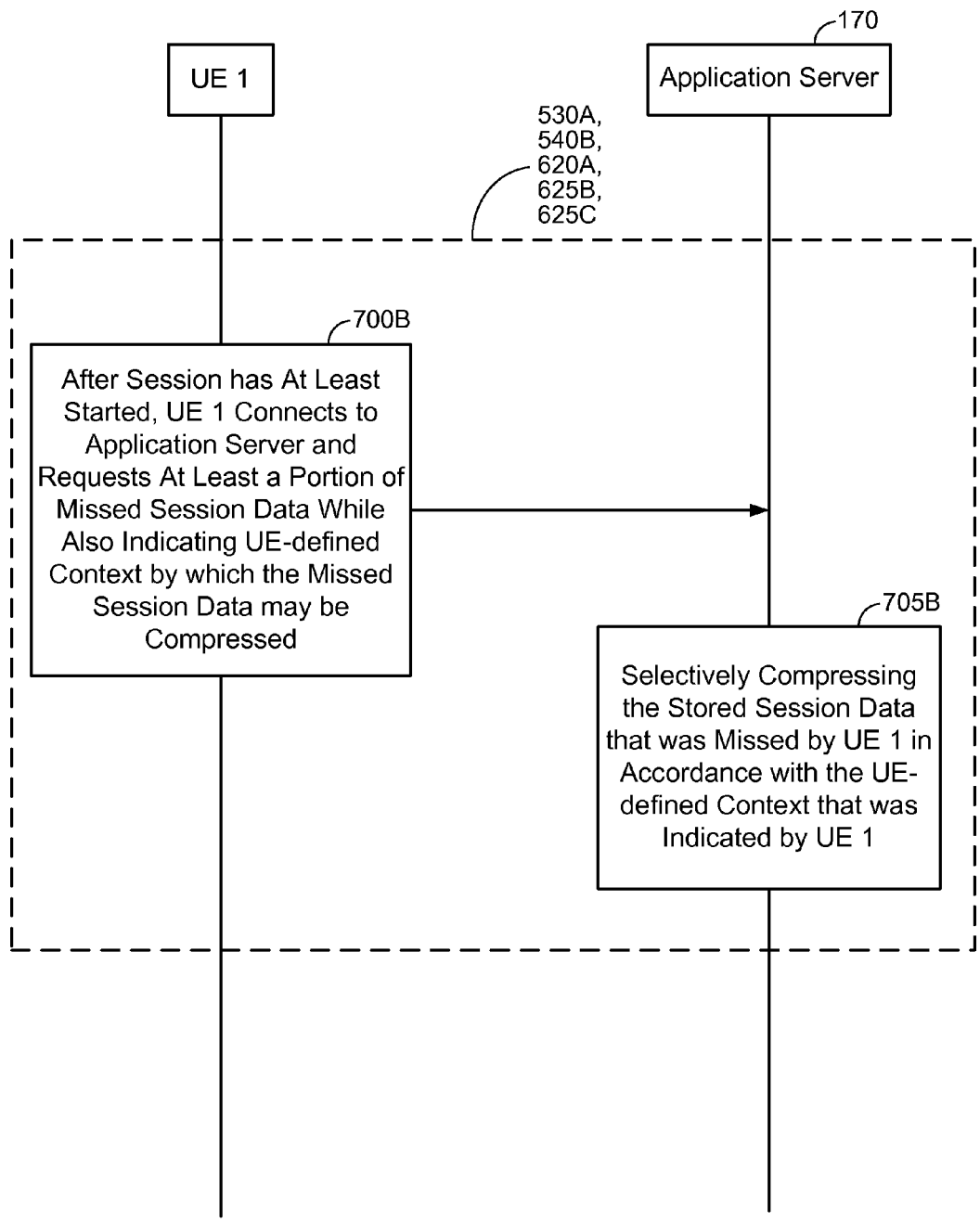
FIG. 7B illustrates an example of providing an application server with a UE-defined context used to selectively compress session data in accordance with another embodiment of the invention.

FIGS. 7A and 7B illustrate example implementation of process 530A, 540B, 620A, 625B, and/or 625C of FIGS. 5A, 5B, 6A, 6B and 6C, respectively, in accordance with embodiments of the invention. Referring to FIG. 7A, before a communication session commences, UE 1 can pre-configure a UE-defined context to be used for selective compression of session data for a subsequent communication session that is missed by UE 1, 700A. For example, the UE 1 can provide an estimate of its current bandwidth capacity to the application server 170 associated with a current network connection. In addition, UE 1 can specify a set of user preferences of what session data content to be included or excluded in associated with the compression. After configuring the UE-defined context, then the application server 170 executes the processes depicted in FIGS. 5A, 5B, 6A, 6B and/or 6C while performing the selective compression operation based on the pre-configured UE-defined context, 705A. Compression can be based on many factors, including but not limited to, bandwidth, past history between application server 170 and UE 1, type of session data, priority ranking of data to be pushed.

Referring to FIG. 7A, in an example, the UE-defined context can include a list of UEs that UE 1 is interested in monitoring. For example, UE 1 may be controlled by an employee that is interested in following session data that originates from his/her manager, his/her colleagues, and so on. Thus, in this example, 700A of FIG. 7A can add the list of UEs to the pre-configured context for UE 1. After UE 1 misses session data in any of FIGS. 5A through 6C, the application server 170 can then evaluate the missed portion of session data for UE 1 to determine whether any of the session media originated from a listed UE and/or any signaling information associated with any listed UEs (e.g., when the listed UEs joined/left the session, when the listed UEs held the floor, etc.). The application server 170 can compress the missed media in 705A by filtering out session media that originated from non-listed UEs and/or signaling information associated with non-listed UEs, 705A, and can then send the remainder of the session data to UE 1 as the selectively compressed session data.

Referring to FIG. 7A, in another example, the UE-defined context can include a set of one or more applications configured for execution on UE 1. For example, UE 1 may want to continue to execute one or more applications (e.g., such as a Web browser) in conjunction with acquiring missed session data. In this case, in 700A of FIG. 7A can add a list of the one or more applications to the pre-configured context for UE 1. After UE 1 misses session data in any of FIGS. 5A through 6C, the application server 170 can then evaluate the current applications executing on UE 1 to determine whether one or more of the currently executing applications corresponds to a listed applications. The application server 170 can compress the missed session data in 705A by modifying the missed session data to conform with operation of the currently executing applications. For example, a Web browser may be expected to consume half of a display screen of UE 1, such that the application server 170 can compress the missed session data by reducing a video resolution of a video portion of the missed session data to conform with the remaining half of the display screen of UE 1.

Referring to FIG. 7A, in another example, the UE-defined context can include a set of conversations on UE 1. For example, UE 1 may want to continue to participate in one or more conversations (e.g., text conversations, voice conversations, etc.) in conjunction with acquiring missed session data. In this case, in 700A of FIG. 7A can add a list of the one or more conversations to the pre-configured context for UE 1. After UE 1 misses session data in any of FIGS. 5A through 6C, the application server 170 can then evaluate whether UE 1 is currently engaged in one of the listed conversations. If so, the application server 170 can compress the missed session data in 705A by modifying the missed session data to accommodate the current conversation at UE 1. For example, if UE 1 is engaged in a voice call, the application server 170 can compress the missed session data by converting an audio portion of the missed session data into text so as not to interfere with the voice call. In another example, if UE 1 is engaged in a text conversation and the missed session data includes text, the application server 170 can compress the missed session data by converting a text portion of the missed session data into audio so as not to interfere with the text conversation.

Referring to FIG. 7A, in another example, the UE-defined context can include a bandwidth available at UE 1. For example, UE 1 may transition between different bandwidth environments (e.g., WiFi, 3G, 1x, etc.) while moving throughout the wireless communications system. In this case, in 700A of FIG. 7A can add bandwidth information to the pre-configured context for UE 1 and associate the bandwidth information with different compression preferences. After UE 1 misses session data in any of FIGS. 5A through 6C, the application server 170 can then evaluate whether UE 1 a current bandwidth for UE 1 and compare the current bandwidth of UE 1 with UE 1's compression preferences to identified a given compression protocol. The application server 170 can compress the missed session data in 705A by modifying the missed session data in accordance with the identified compression protocol. For example, if UE 1 is in a low-bandwidth environment, the application server 170 can compress the missed session data by dropping a video portion and converting an audio portion to text. In another example, if UE 1 is in an intermediate-bandwidth environment, the application server 170 can compress the missed session data by reducing a resolution or data rate of a video portion.

Referring to FIG. 7A, in another example, a user of UE 1 may have access to a plurality of different types of UEs that each have different device characteristics (e.g., a tablet computer, a desktop computer, a smart phone, a laptop, etc.). In this example, the UE-defined context can include a device type of the UE to which the session data is to be transmitted. The device-type of UE 1 can be conveyed to the application server 170 in a pre-configured manner so that the application server 170 knows the device-type in advance of the compression at 700A of FIG. 7A, or alternatively the device-type can be conveyed by UE 1 to the application server 170 in conjunction with the request for the session data at 700B of FIG. 7B, as will be discussed below in more detail. In either case, the application server 170 can compress the missed session data in 705A by modifying the missed session data in accordance with the identified device-type of UE 1. For example, if UE 1 is a small form-factor device (e.g., a smartphone, etc.), the application server 170 can compress the missed session data by reducing a video resolution. In another example, if UE 1 is connected to a large black-and-white display, the application server 170 can compress the missed session data by maintaining the video resolution but converting the color of the video to grayscale, and so on.

FIG. 7B is similar to FIG. 7A except that FIG. 7B illustrates an example whereby the UE-defined context is defined in conjunction with a request to acquire at least a portion of missed session data in accordance with an embodiment of the invention.

Referring to FIG. 7B, after a communication session has at least started (e.g., during the communication session, after the communication session terminates, etc,), UE 1 connects to the application server 170 and requests at least a portion of missed session data while also indicating a UE-defined context for UE 1 by which the missed session data may be compressed, 700B. Then, the application server 170 selectively compresses the stored session data that was missed by UE 1 in accordance with the UE-defined context that was indicated by UE 1, 705B.

Referring to FIG. 7B, in an example, the UE-defined context indicated in conjunction with the request for missed session data can include a list of UEs that UE 1 is interested in monitoring. The application server 170 can compress the missed media in 705B by filtering out session media that originated from non-listed UEs and/or signaling information associated with non-listed UEs, and can then send the remainder of the session data to UE 1 as the selectively compressed session data.

Referring to FIG. 7B, in another example, the UE-defined context indicated in conjunction with the request for missed session data can include a set of one or more applications configured for execution on UE 1. For example, UE 1 may indicate that it is actively engaged in a Web browsing session occupying half of its display screen. In this example, the application server 170 can compress the missed session data by reducing a video resolution of a video portion of the missed session data to conform with the remaining half of the display screen of UE 1.

Referring to FIG. 7B, in another example, the UE-defined context indicated in conjunction with the request for missed session data can include a conversation in which UE 1 actively engaged. For example, if UE 1 indicates that UE 1 is engaged in a voice call, the application server 170 can compress the missed session data by converting an audio portion of the missed session data into text so as not to interfere with the voice call. In another example, if UE 1 indicates that UE 1 is engaged in a text conversation and the missed session data includes text, the application server 170 can compress the missed session data by converting a text portion of the missed session data into audio so as not to interfere with the text conversation.

Referring to FIG. 7B, in an example, the UE-defined context indicated in conjunction with the request for missed session data can include a current bandwidth available at UE 1. The application server 170 can compress the missed session data in 705A by modifying the missed session data into a format suitable for the current bandwidth available at UE 1. For example, if UE 1 is in a low-bandwidth environment, the application server 170 can compress the missed session data by dropping a video portion and converting an audio portion to text. In another example, if UE 1 is in an intermediate-bandwidth environment, the application server 170 can compress the missed session data by reducing a resolution or data rate of a video portion Referring to FIG. 7B, in another example, UE 1 can become aware that session data associated with the communication session has been missed. For example, UE 1 may have been an earlier participant in the communication session that subsequently lost its connection, UE 1 may have receive a late announce message for the communication session, UE 1 may log onto the application server 170 and be notified that the communication session has already started or has terminated, and so on. In response to such a determination, UE 1 can be provided with a summary of file-types (e.g., audio, video, text, files from UE 2, files from UEs located in California, files from UEs that are social networking contacts of UE 1, etc.) missed by UE 1 during the communication session. UE 1 then picks and chooses the specific files from the summary files (e.g., reference to video files, audio files, conversation, and/or other session data types) that UE 1 wishes to obtain, and then packages the file-type preferences into a request that forms the UE-define context, 700B. After receiving the file request, the application server 170 forwards to UE 1 only the files that were requested, 705B. Optionally, UE 1 can issue supplemental requests for other portions of missed session data (e.g., the original video file with full resolution).

Referring to FIG. 7B, in another example, another UE (not UE 1) can provide the UE-defined context for UE 1. For example, another UE can insert "markers" into the communication session that indicate points of interest for any UE or for UE 1 specifically (e.g., UE 2 may be aware that UE 1 is interested in spelunking and can insert a marker into the conversation to flag a portion of the session dedicated to a spelunking conversation for UE 1's benefit). Thus, when UE 1 requests the missed session data, the compression can occur based in part on the above-noted flag, which forms part of the UE-defined context for UE 1.

As will be appreciated from a review of FIGS. 7A and 7B, the application server 170 selectively compresses the missed portion of the session data for delivery to UE 1. The manner in which the missed portion of the session data can be compressed can be based on a UE-defined context that is specific for UE 1, whereby the UE-defined context can be based upon a number of different factors or different algorithms, such as (i) an estimation of bandwidth to the UE via its new connection, or (ii) compression rules that are conveyed to the application server 170 via one or more of the session participants, and so on. Accordingly, instead of simply forwarding all missed data to UE 1 as in a conventional store-and-forward system, the application server 170 can be more selective in terms of how the missed data is compressed, which type of missed data is sent to the UE, and so on, while also taking into account system constraints.

Furthermore, in FIGS. 7A and 7B, the application server 170 can decide when to use processing power to compress the data (e.g., in advance of UE 1 requesting the missed session data, or in response to UE 1 requesting the missed session data). The application server 170 can create packages specific to UE 1 for a particular session.

Similar to FIGS. 7A and 7B, FIGS. 8A and 8B also illustrate example implementation of blocks 530A, 540B, 620A, 625B, and/or 625C of FIGS. 5A, 5B, 6A, 6B and 6C, respectively, in accordance with embodiments of the invention. However, FIGS. 7A and 7B focus on how the UE-defined context is acquired by the application server 170, and FIGS. 8A and 8B focus on how the session data is actually compressed.

Figure 8A:
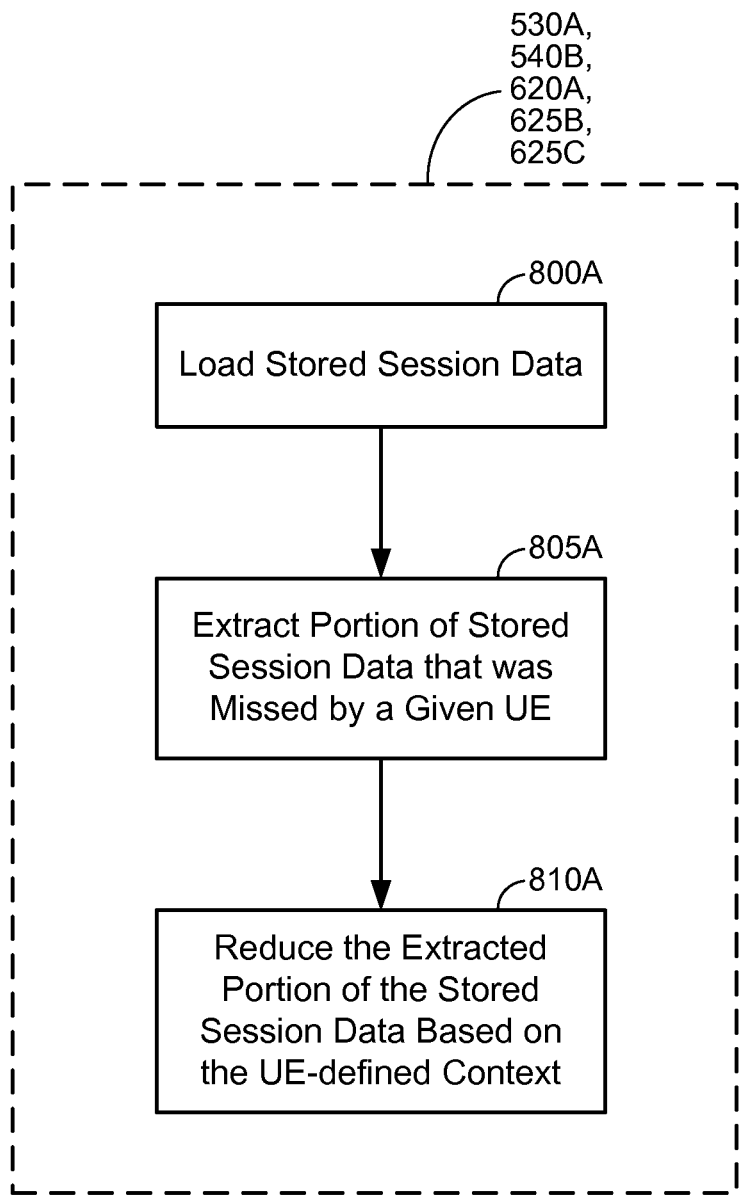
FIG. 8A illustrates an example of selectively compressing session data based on a UE-defined context in accordance with an embodiment of the invention.

Referring to FIG. 8A, stored session data for a given communication session is loaded by the application server 170 in 800A, in response to an implicit or explicit (i.e., active) request for the stored session data. After loading the stored session data, the application server 170 extracts a portion of the stored session data that was missed by UE 1, 805A. As noted above, the missed session data can correspond to all session data (e.g., if UE 1 never participated in the communication session) or less than all session data (e.g., if UE 1 participated during some portion of the communication session). Thus, 805A may be performed based upon information regarding which parts of the communication session UE 1 missed and which parts of the communication session UE 1 did not miss (if any). After extracting the missed session data in 805A, the application server 170 reduces (or "compresses") the extracted portion based on the UE-defined context, 810A, which can be acquired as discussed above in 700A of FIG. 7A and/or 700B of FIG. 7B. Examples of how the reduction or compression of 810A can be executed are described above with respect to FIG. 7A and FIG. 7B (e.g., reducing video resolution in low-bandwidth environments such as downsizing an 8×10 picture to an equivalent resolution for viewing a 4×5 picture, excluding video and/or audio, translating an audio file by converting audio to text, etc.), and will not be described further for the sake of brevity.

Figure 8B:
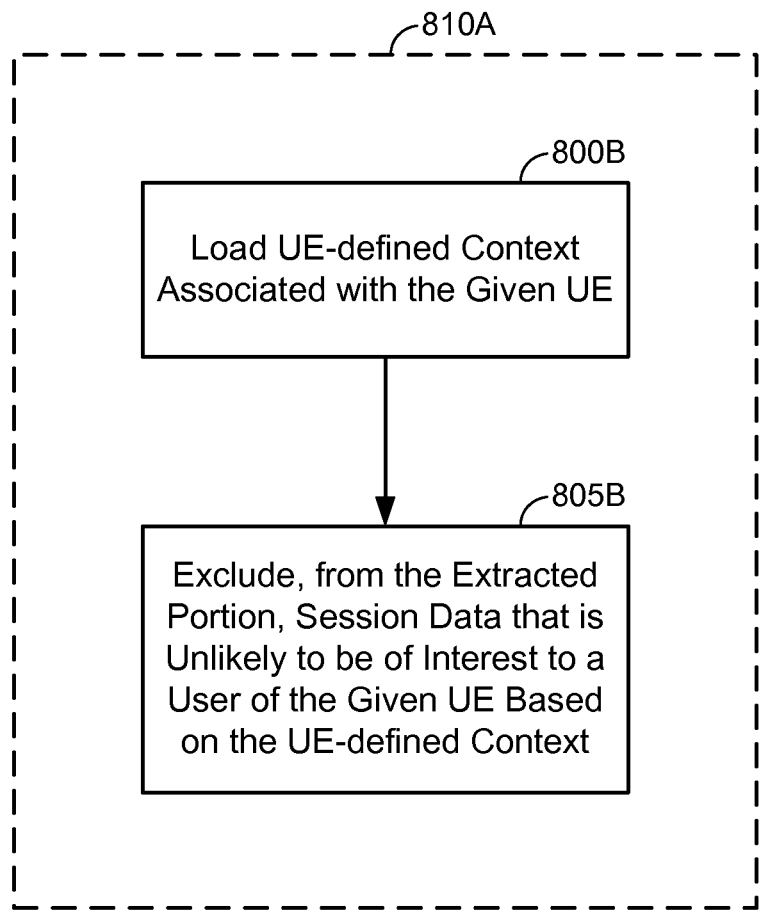
FIG. 8B illustrates an example of selectively compressing session data based on a UE-defined context in accordance with another embodiment of the invention.

FIG. 8B illustrates an example implementation of 810A of FIG. 8A. In FIG. 8B, after extracting the missed session data for UE 1, the application server 170 loads the UE-defined context for UE 1, 800B. The application server 170 then excludes, from the extracted portion (i.e., the missed session data), session media and/or session signaling information that is unlikely to be of interest to UE 1 based on the UE-defined context for UE 1. Accordingly, the exclusion of 805B can include filtering out video if UE 1 does not have a screen or the screen is currently occupied, dropping portions of the communication session between UEs that UE 1 is not interested in, and so on. As will be appreciated, in other examples the compression of the session need not be based on interest as shown in FIG. 8B, and could instead be based on the UE-defined context in other ways (e.g., reducing resolutions of video in low-bandwidth environments, etc.).

Further, with respect to FIGS. 8A and 8B, the session data that is excluded at 810A and/or 805B can additionally be based upon a data-specific context (irrespective of the UE-defined context). For example, the session data can be tagged into several categories including, but not limited to: data that must always be sent (e.g., group management data, one-on-one Media, Group Media, Group Adds/Removes, Participation Suppression); data not required to be sent after a long outage (e.g., presence data), ancillary signaling (marked as Ephemeral) and conversation management (e.g. current relevant position, pre-join "catch-up" position). Accordingly, the session data reduction or exclusion of 810A and/or 805B may be implemented in a manner that takes the data-specific context into account. For example, even if UE 1 did not explicitly indicate an interest or disinterest in the above-noted data in his/her UE-defined context, this data may still be sent to UE 1 or blocked from transmission to UE 1 for reasons that are specific to the data itself (i.e., applicable to UE-defined contexts for any UE).

In the description of the embodiments provided above with respect to FIGS. 5A, 5B, 6A and/or 7A, UE 1 misses at least a portion of session data of a communication session and later reconnects to the application server 170 and acquires a compressed version of the missed session data. In instances where the missed session data is not actively requested by UE 1, the application server 170 can attempt to push the compressed version of the missed session data in a smart or efficient manner (i.e., so that the compressed version of the missed session data is not simply dumped onto UE 1 the moment that UE 1 establishes its connection to the application server 170), as will now be described in detail.

The application server 170 (or push server) may evaluate a given set of factors to determine when to push the compressed version of the missed session data to UE 1. The given set of factors may include (i) a priority of UE 1, (ii) a priority of UE(s) that originated the missed session data, (iii) a number of participants in the communication session, (iv) a type of media being exchanged via the communication session, (v) a device-type (e.g., phone, PC, etc.) of UE 1 and/or UE(s) that originated the missed session data, (vi) a type of system (e.g., WiFi, 3G, etc.) over which UE 1 is connected and/or (vii) a battery life expectancy of UE 1. By evaluating the given set of factors, the load on the application server 170 (or push server) at any given point in time can be reduced or maintained at a manageable level.

For example, the load on the application server 170 (or push server) and/or the battery life of UE 1 can be controlled by conveying the compressed version of the missed session data via a series of slow-pushes (i.e., small file-size transfers). In another example, an originator of a portion of the missed session data may be a high priority user (at least, to UE 1), such that media from the high priority user can be pushed ahead of media from lower-priority users among the compressed version of the missed session data. Alternatively, the compression of the missed session data can simply exclude the session data from the lower-priority UE(s).

In another example, as noted above, the given set of factors used to affect when the compressed version of the missed session data is pushed to UE 1 can include the size of the group participating in the communication session. For example, if the communication session is one-to-one, it is known that any session data provided by the other UE is intended for UE 1, such that the push of the missed session data can be prioritized. Alternatively, if the communication session includes 1000 participants, it is statistically unlikely that the user of UE 1 will be particularly interested in media from any one particular UE, such that pushes of media from these UEs can be conducted when convenient (i.e., not necessarily in a prioritized manner). Of course, the application server 170 may have specialized knowledge regarding the relevance or priority of the transmitting UE to UE 1 (e.g., the transmitting UE is part of UE 1's server-based address book), in which case the transmitted UE's session data can be pushed to UE 1 in a prioritized manner even if the number of participants in the communication session is relatively high.

In another example, as noted above, the type of media being exchanged via the communication session can affect if or when the compressed version of the missed session data is pushed to UE 1. For example, if UE 1 missed a few presence updates (e.g., a few UEs joined the communication session while other UEs dropped out of the communication session while UE 1 was not part of the communication session), UE 1 can simply be expected to load up-to-date presence information when re-joining the session and need not receive the presence update via a prioritized push procedure. Presence pushes can be omitted in some instances, in other words.

In another example, as noted above, the given set of factors can include a designation (or type) of the transmitting UE and/or the system over which the missed session data is to be transmitted. For example, the transmitting UE that provides session media while UE 1 is disconnected from the communication session can indicate, to the application server 170, that the session data should not be pushed to UE 1. Rather, the application server 170 can simply wait for UE 1 to request this session data. For example, the session data missed by UE 1 can be provided by UE 2 and can correspond to a voice note or memo, and a user of UE 2 can indicate that the voice note or memo has a relatively low priority and need not be pushed to UE 1 (i.e., by including a "no-push" flag, so that UE 1 is not interrupted with the voice note in "real time", but rather only when UE 1 is requesting its missed session data). For example, the backend server may attempt to deliver the voice note or memo upon receipt from UE 2, but if UE 1 was unreachable, the application server 170 (or push server) can refrain from waking up UE 1 if UE 2 marked the content with a "no-push" flag. Alternatively, even in the absence of an explicit "no-push" flag from the transmitting UE or UE 2, the application sever 170 can execute its own decision logic to categorize certain session data as "no-push" so that UE 1 is not bothered with missed session data that is deemed as lower priority.

Figure 9:
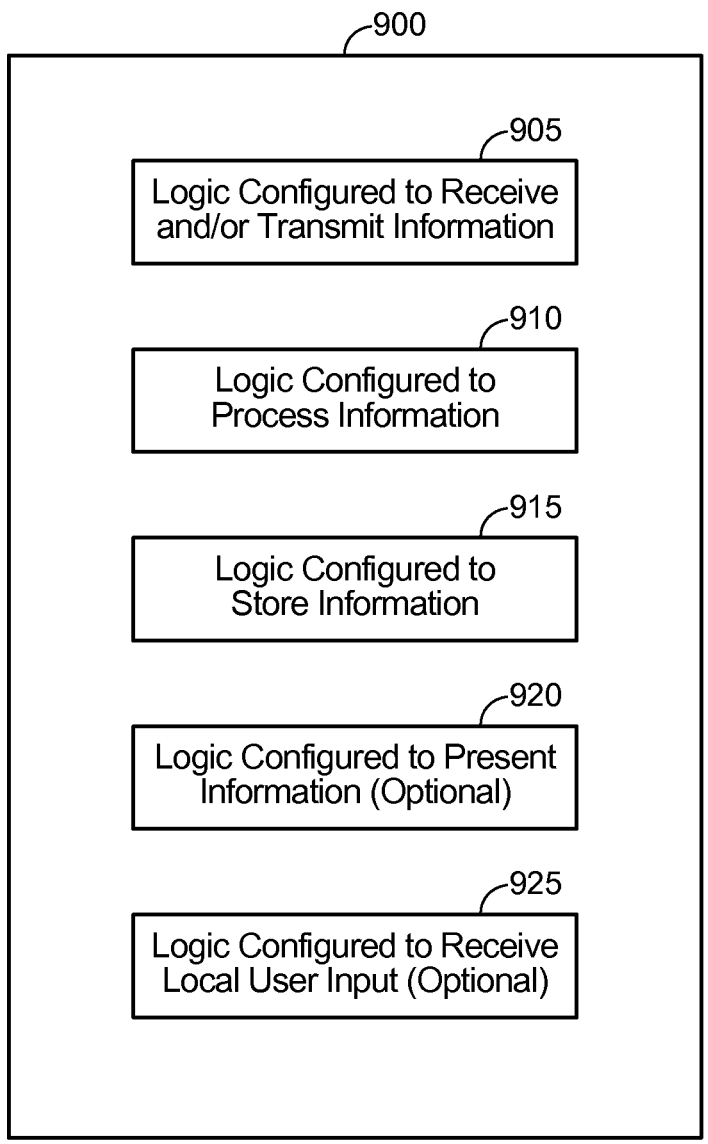
FIG. 9 illustrates a communication device that includes logic configured to perform functionality in accordance with an embodiment of the invention.

FIG. 9 illustrates a communication device 900 that includes logic configured to perform functionality in accordance with an embodiment of the invention. The communication device 900 can correspond to any of the above-noted communication devices, including but not limited to UEs 102, 108, 110, 112 or 200, Node Bs or base stations 124, the RNC or base station controller 122, a packet data network end-point (e.g., SGSN 160, GGSN 165, etc.), any of the servers 170 through 186, etc. Thus, communication device 900 can correspond to any electronic device that is configured to communicate with (or facilitate communication with) one or more other entities over a network.

Referring to FIG. 9, the communication device 900 includes logic configured to receive and/or transmit information 905. In an example, if the communication device 900 corresponds to a wireless communications device (e.g., UE 200, Node B 124, etc.), the logic configured to receive and/or transmit information 905 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 905 can correspond to a wired communications interface (e.g., a serial connection, a USB or Firewire connection, an Ethernet connection through which the Internet 175 can be accessed, etc.). Thus, if the communication device 900 corresponds to some type of network-based server (e.g., SGSN 160, GGSN 165, application server 170, etc.), the logic configured to receive and/or transmit information 905 can correspond to an Ethernet card, in an example, that connects the network-based server to other communication entities via an Ethernet protocol. In a further example, the logic configured to receive and/or transmit information 905 can include sensory or measurement hardware by which the communication device 900 can monitor its local environment (e.g., an accelerometer, a temperature sensor, a light sensor, an antenna for monitoring local RF signals, etc.). The logic configured to receive and/or transmit information 905 can also include software that, when executed, permits the associated hardware of the logic configured to receive and/or transmit information 905 to perform its reception and/or transmission function(s). However, the logic configured to receive and/or transmit information 905 does not correspond to software alone, and the logic configured to receive and/or transmit information 905 relies at least in part upon hardware to achieve its functionality.

Referring to FIG. 9, the communication device 900 further includes logic configured to process information 910. In an example, the logic configured to process information 910 can include at least a processor. Example implementations of the type of processing that can be performed by the logic configured to process information 910 includes but is not limited to performing determinations, establishing connections, making selections between different information options, performing evaluations related to data, interacting with sensors coupled to the communication device 900 to perform measurement operations, converting information from one format to another (e.g., between different protocols such as .wmv to .avi, etc.), and so on. For example, the processor included in the logic configured to process information 910 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 910 can also include software that, when executed, permits the associated hardware of the logic configured to process information 910 to perform its processing function(s). However, the logic configured to process information 910 does not correspond to software alone, and the logic configured to process information 910 relies at least in part upon hardware to achieve its functionality.

Referring to FIG. 9, the communication device 900 further includes logic configured to store information 915. In an example, the logic configured to store information 915 can include at least a non-transitory memory and associated hardware (e.g., a memory controller, etc.). For example, the non-transitory memory included in the logic configured to store information 915 can correspond to RAM memory, flash memory, ROM memory, EPROM memory, EEPROM memory, registers, hard disk, a removable disk, a CD-ROM, or any other form of storage medium known in the art. The logic configured to store information 915 can also include software that, when executed, permits the associated hardware of the logic configured to store information 915 to perform its storage function(s). However, the logic configured to store information 915 does not correspond to software alone, and the logic configured to store information 915 relies at least in part upon hardware to achieve its functionality.

Referring to FIG. 9, the communication device 900 further optionally includes logic configured to present information 920. In an example, the logic configured to present information 920 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 900. For example, if the communication device 900 corresponds to UE 200 as shown in FIG. 3, the logic configured to present information 920 can include the display 224. In a further example, the logic configured to present information 920 can be omitted for certain communication devices, such as network communication devices that do not have a local user (e.g., network switches or routers, remote servers, etc.). The logic configured to present information 920 can also include software that, when executed, permits the associated hardware of the logic configured to present information 920 to perform its presentation function(s). However, the logic configured to present information 920 does not correspond to software alone, and the logic configured to present information 920 relies at least in part upon hardware to achieve its functionality.

Referring to FIG. 9, the communication device 900 further optionally includes logic configured to receive local user input 925. In an example, the logic configured to receive local user input 925 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 900. For example, if the communication device 900 corresponds to UE 200 as shown in FIG. 3, the logic configured to receive local user input 925 can include the display 224 (if implemented a touch-screen), keypad 226, etc. In a further example, the logic configured to receive local user input 925 can be omitted for certain communication devices, such as network communication devices that do not have a local user (e.g., network switches or routers, remote servers, etc.). The logic configured to receive local user input 925 can also include software that, when executed, permits the associated hardware of the logic configured to receive local user input 925 to perform its input reception function(s). However, the logic configured to receive local user input 925 does not correspond to software alone, and the logic configured to receive local user input 925 relies at least in part upon hardware to achieve its functionality.

Referring to FIG. 9, while the configured logics of 905 through 925 are shown as separate or distinct blocks in FIG. 9, it will be appreciated that the hardware and/or software by which the respective configured logic performs its functionality can overlap in part. For example, any software used to facilitate the functionality of the configured logics of 905 through 925 can be stored in the non-transitory memory associated with the logic configured to store information 915, such that the configured logics of 905 through 925 each performs their functionality (i.e., in this case, software execution) based in part upon the operation of software stored by the logic configured to store information 915. Likewise, hardware that is directly associated with one of the configured logics can be borrowed or used by other configured logics from time to time. For example, the processor of the logic configured to process information 910 can format data into an appropriate format before being transmitted by the logic configured to receive and/or transmit information 905, such that the logic configured to receive and/or transmit information 905 performs its functionality (i.e., in this case, transmission of data) based in part upon the operation of hardware (i.e., the processor) associated with the logic configured to process information 910. Further, the configured logics or "logic configured to" of 905 through 925 are not limited to specific logic gates or elements, but generally refer to the ability to perform the functionality described herein (either via hardware or a combination of hardware and software). Thus, the configured logics or "logic configured to" of 905 through 925 are not necessarily implemented as logic gates or logic elements despite sharing the word "logic". Other interactions or cooperation between the configured logics 905 through 925 will become clear to one of ordinary skill in the art from a review of the embodiments described above.

Further, in an embodiment, "missed" session data can correspond to session data that was never received by a particular UE. Alternatively, "missed" session data can correspond to session data that was delivered to the particular UE but is then re-sent to the UE. For example, a user may have initially participated in a communication session via a given UE and then missed some aspect of the communication session at his/her end, so that the user wants to review the user-missed portion of the session. Thus, "missed" session data should not be construed as necessarily limited to data exchanged during a UE-outage period.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of providing previously communicated session information, comprising:
   exchanging session data between a group of session participants during a communication session, the exchanged session data including session media and/or session signaling information;
   storing at least a subset of the exchanged session data;
   establishing a connection to a given user equipment (UE);
   determining a UE-defined context that is indicative of a manner by which missed session data from the communication session is to be compressed for delivery to the given UE;
   selectively compressing at least a portion of the stored subset of the exchanged session data that was missed by the given UE based on the UE-defined context; and
   transmitting the selectively compressed portion of the stored subset of the exchanged session data to the given UE.

2. The method of claim 1, wherein the UE-defined context includes (i) a first list of users that the given UE is interested in, (ii) a second list of users that the given UE is not interested in, (iii) a current bandwidth of the given UE and/or compression preferences of the given UE based on bandwidth status, (iv) a current set of applications executing on the given UE and/or compression preferences of the given UE based on application execution status (v) a current set of conversations in which the given UE is engaged and/or compression preferences of the given UE based on conversation status and/or (vi) a device-type of the given UE.

3. The method of claim 1,
   wherein the UE-defined context includes a current bandwidth between an application server arbitrating the communication session and the given UE; and
   wherein the selectively compressing step includes:
   compressing the portion of the stored subset of the exchanged session data that was missed by the given UE to a format that conforms with the current bandwidth.

4. The method of claim 1,
   wherein the UE-defined context is based upon compression parameters from one or more of the session participants during the communication session; and
   wherein the selectively compressing step includes:
   compressing the portion of the stored subset of the exchanged session data that was missed by the given UE to a format in accordance with the compression parameters.

5. The method of claim 1,
   wherein the given UE corresponds to a previous session participant of the communication session that dropped out of the communication session such that the establishing step corresponds to a re-establishment of the connection, and
   wherein the selectively compressed portion of the stored subset of the exchanged session data to the given UE corresponds to session data between (i) a first time at which the given UE previously dropped out of the communication session and (ii) a second time at which the given UE re-established the connection or a third time at which the communication session terminated.

6. The method of claim 1, wherein the establishing step corresponds to the given UE actively establishing or reestablishing its connection to a server storing the missed session data in order to request the missed session data.

7. The method of claim 1, wherein the establishing and transmitting steps collectively correspond to a push procedure implemented to trigger the given UE to wake up in order to receive the transmitted session data.

8. The method of claim 7, further comprising:
   scheduling the push procedure based on one or more of (i) a priority of the given UE, (ii) a priority of session participant(s) that originated the missed session data, (iii) a number of the group of session participants in the communication session, (iv) a type of media being exchanged via the communication session, (v) a device-type of the given UE and/or of UE(s) operated by one or more other of the group of session participants that originated the missed session data, (vi) a type of system over which the given UE is connected and/or (vii) a battery life expectancy of the given UE.

9. The method of claim 1, wherein the given UE corresponds to a new session participant or late entrant into the communication session, such that the establishing step corresponds to an initial connection of the given UE to the communication session.

10. A method of obtaining previously communicated session information at a given user equipment (UE), comprising:
    establishing a connection to an application server that previously began arbitrating a communication session between a group of session participants and exchanging session data between the group of session participants during the communication session, the exchanged session data including session media and/or session signaling information;
    providing a UE-defined context that is indicative of a manner by which missed session data from the communication session is to be compressed for delivery to the given UE; and
    receiving a selectively compressed portion of the missed session data from the communication session based on the UE-defined context.

11. The method of claim 10, wherein the providing step provides the UE-defined context to the application server prior to establishing the connection to the application server.

12. The method of claim 10, wherein the providing step provides the UE-defined context to the application server in conjunction with establishing the connection to the application server.

13. The method of claim 10, wherein the UE-defined context includes (i) a first list of users that the given UE is interested in, (ii) a second list of users that the given UE is not interested in, (iii) a current bandwidth of the given UE and/or compression preferences of the given UE based on bandwidth status, (iv) a current set of applications executing on the given UE and/or compression preferences of the given UE based on application execution status (v) a current set of conversations in which the given UE is engaged and/or compression preferences of the given UE based on conversation status and/or (vi) a device-type of the given UE.

14. The method of claim 10, wherein the establishing step corresponds to the given UE actively establishing or reestablishing its connection to the application server storing the missed session data in order to request the missed session data.

15. The method of claim 10, wherein the establishing and receiving steps collectively correspond to a push procedure that trigger the given UE to wake up in order to receive the selectively compressed portion of the missed session data.

16. The method of claim 15, wherein the push procedure is scheduled based on one or more of (i) a priority of the given UE, (ii) a priority of session participant(s) that originated the missed session data, (iii) a number of the group of session participants in the communication session, (iv) a type of media being exchanged via the communication session, (v) a device-type of the given UE and/or of UE(s) operated by one or more other of the group of session participants that originated the missed session data, (vi) a type of system over which the given UE is connected and/or (vii) a battery life expectancy of the given UE.

17. The method of claim 10, further comprising:
presenting the received session data to a user of the given UE.

18. The method of claim 17,
wherein the received session data is received while the communication session is still active,
wherein the given UE joins the active communication session after the establishing step, and
wherein the presenting step occurs concurrently with the given UE joining the active communication session in real-time.

19. The method of claim 18,
wherein the communication session is associated with an exchange of audio media between the group of session participants, and
wherein the presenting step presents a text-translation of the audio media from the missed session data while the given UE concurrently presents real-time audio media from the communication session to the user of the given UE.

20. A server configured to provide previously communicated session information, comprising:
means for exchanging session data between a group of session participants during a communication session, the exchanged session data including session media and/or session signaling information;
means for storing at least a subset of the exchanged session data;
means for establishing a connection to a given user equipment (UE);
means for determining a UE-defined context that is indicative of a manner by which missed session data from the communication session is to be compressed for delivery to the given UE;
means for selectively compressing at least a portion of the stored subset of the exchanged session data that was missed by the given UE based on the UE-defined context; and
means for transmitting the selectively compressed portion of the stored subset of the exchanged session data to the given UE.

21. A given user equipment (UE) configured to obtain previously communicated session information, comprising:
means for establishing a connection to an application server that previously began arbitrating a communication session between a group of session participants and exchanging session data between the group of session participants during the communication session, the exchanged session data including session media and/or session signaling information;
means for providing a UE-defined context that is indicative of a manner by which missed session data from the communication session is to be compressed for delivery to the given UE; and
means for receiving a selectively compressed portion of the missed session data from the communication session based on the UE-defined context.

22. A server configured to provide previously communicated session information, comprising:
logic configured to exchange session data between a group of session participants during a communication session, the exchanged session data including session media and/or session signaling information;
logic configured to store at least a subset of the exchanged session data;
logic configured to establish a connection to a given user equipment (UE);
logic configured to determine a UE-defined context that is indicative of a manner by which missed session data from the communication session is to be compressed for delivery to the given UE;
logic configured to selectively compress at least a portion of the stored subset of the exchanged session data that was missed by the given UE based on the UE-defined context; and
logic configured to transmit the selectively compressed portion of the stored subset of the exchanged session data to the given UE.

23. A given user equipment (UE) configured to obtain previously communicated session information, comprising:
logic configured to establish a connection to an application server that previously began arbitrating a communication session between a group of session participants and exchanging session data between the group of session participants during the communication session, the exchanged session data including session media and/or session signaling information;
logic configured to provide a UE-defined context that is indicative of a manner by which missed session data from the communication session is to be compressed for delivery to the given UE; and
logic configured to receive a selectively compressed portion of the missed session data from the communication session based on the UE-defined context.

24. A non-transitory computer-readable medium containing instructions stored thereon, which, when executed by a server configured to provide previously communicated session information, cause the server to perform operations, the instructions comprising:
program code to exchange session data between a group of session participants during a communication session, the exchanged session data including session media and/or session signaling information;
program code to store at least a subset of the exchanged session data;
program code to establish a connection to a given user equipment (UE);
program code to determine a UE-defined context that is indicative of a manner by which missed session data from the communication session is to be compressed for delivery to the given UE;

program code to selectively compress at least a portion of the stored subset of the exchanged session data that was missed by the given UE based on the UE-defined context; and program code to transmit the selectively compressed portion of the stored subset of the exchanged session data to the given UE.

25. A non-transitory computer-readable medium containing instructions stored thereon, which, when executed by a given user equipment (UE) configured to obtain previously communicated session information, cause the given UE to perform operations, the instructions comprising:

program code to establish a connection to an application server that previously began arbitrating a communication session between a group of session participants and exchanging session data between the group of session participants during the communication session, the exchanged session data including session media and/or session signaling information;

program code to provide a UE-defined context that is indicative of a manner by which missed session data from the communication session is to be compressed for delivery to the given UE; and program code to receive a selectively compressed portion of the missed session data from the communication session based on the UE-defined context.

\* \* \* \* \*